(12) United States Patent
Morinaga

(10) Patent No.: US 11,307,701 B2
(45) Date of Patent: Apr. 19, 2022

(54) DISPLAY DEVICE INCLUDING POSITION INPUT FUNCTION

(71) Applicant: Sharp Kabushiki Kaisha, Sakai (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/183,410

(22) Filed: Feb. 24, 2021

(65) Prior Publication Data

US 2021/0278921 A1 Sep. 9, 2021

Related U.S. Application Data

(60) Provisional application No. 62/984,362, filed on Mar. 3, 2020.

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04107* (2013.01)

(58) Field of Classification Search
CPC ........... G02F 1/13338; G02F 1/134336; G02F 1/134363; G02F 1/134372; G02F 1/13606; G02F 1/136286; G02F 1/1368; G02F 2201/121; G02F 2201/123; G06F 2203/04111; G06F 2203/04107; G06F 3/0412; G06F 3/04164; G06F 3/044; G06F 3/0443; G06F 3/0446
See application file for complete search history.

(56) References Cited

U.S. PATENT DOCUMENTS

| | | | | |
|---|---|---|---|---|
| 2016/0041665 | A1* | 2/2016 | Gwon | G06F 3/0443 345/174 |
| 2017/0097703 | A1* | 4/2017 | Lee | G06F 3/044 |
| 2017/0192582 | A1* | 7/2017 | Pan | G06F 3/0412 |
| 2018/0120992 | A1* | 5/2018 | Lee | G06F 3/0446 |
| 2019/0079620 | A1 | 3/2019 | Yoshida | |
| 2019/0129538 | A1* | 5/2019 | Yoshida | G06F 3/0443 |
| 2019/0204972 | A1* | 7/2019 | Shin | G06F 3/0416 |

FOREIGN PATENT DOCUMENTS

JP 2019-053117 A 4/2019

* cited by examiner

*Primary Examiner* — Hong Zhou
(74) *Attorney, Agent, or Firm* — Keating & Bennett, LLP

(57) ABSTRACT

A display device including a position input function, includes a pixel electrode; an image wire that is disposed adjacent to the pixel electrode and supplies an image signal to the pixel electrode; a plurality of position detection wires that are arranged side by side on at least one side of the image wire; and a plurality of position detection electrodes that are connected to the plurality of position detection wires, form a capacitance with a position input body performing position input, detect an input position by the position input body, and include an opening portion which overlaps with the plurality of position detection wires arranged on the at least one side of the image wire and is formed in a range straddling the plurality of position detection wires.

19 Claims, 19 Drawing Sheets

DISPLAY DEVICE INCLUDING POSITION INPUT FUNCTION

TECHNICAL FIELD

The technology disclosed herein relates to a display device including a position input function.

BACKGROUND ART

In the related art, a device described in PTL 1 below is known as an example of a liquid crystal display device in which a touch panel function is in-celled. A liquid crystal display device described in PTL 1 includes a plurality of pixel electrodes, a pair of source wires that transmits signals supplied to the plurality of pixel electrodes and interposes the plurality of pixel electrodes, a touch electrode, a touch wire that has a pair of first wiring configuration units interposed between the pixel electrode and the pair of source wires and arranged in a plurality of sets in an arrangement direction and a second wiring configuration unit connecting end portions of two adjacent first wiring configuration units in the arrangement direction, a conductive structure (TFT) disposed in the same layer as that of the touch wire, and a bridge wiring that crosses the conductive structure, has an interlayer insulating film interposed with the conductive structure, and is connected to the end portion in which each portion thereof is not connected to the second wiring configuration unit in the two adjacent first wiring configuration units in the arrangement direction via a contact hole formed as an opening in the interlayer insulating film.

CITATION LIST

Patent Literature

[PTL 1] Japanese Unexamined Patent Application Publication No. 2019-53117

Technical Problem

In the liquid crystal display device described in PTL 1 described above, one touch wire is disposed adjacent to each source wire on one side, respectively. The touch electrode is provided with a plurality of touch wires overlapping opening portions that extend in parallel with an extending direction of each touch wire and are disposed so as to overlap with at least a portion of each touch wire. Since an overlapping area between each touch wire and the touch electrode is reduced by the amount of the touch wire overlapping opening portion, parasitic capacitance that may occur between the touch wire and the touch electrode to which the touch wire is not connected is reduced. However, since the touch wire overlapping opening portion has substantially the same width as that of the touch wire, a pair of side edges in each touch wire and an opening edge of each touch wire overlapping opening portion in the touch electrode have a significantly close positional relationship when viewed in a plane. Therefore, there is a limit to reducing the parasitic capacitance that may occur between the touch wire and the touch electrode to which the touch wire is not connected, and it is difficult to further improve sensitivity related to touch detection.

SUMMARY OF DISCLOSURE

The technique described in the specification of the present application is completed based on the above circumstances, and an object thereof is to improve sensitivity related to position detection.

Solution to Problem (1) A display device including a position input function according to the technique described in the specification of the present application includes a pixel electrode; an image wire that is disposed adjacent to the pixel electrode and supplies an image signal to the pixel electrode; a plurality of position detection wires that are arranged side by side on at least one side of the image wire; and a plurality of position detection electrodes that are connected to the plurality of position detection wires, form a capacitance with a finger as a position input body performing position input, detect an input position by the finger as the position input body, and include an opening portion which overlaps with the plurality of position detection wires arranged on the at least one side of the image wire and is formed in a range straddling the plurality of position detection wires.

(2) In the display device including a position input function, in addition to the above (1), the pixel electrode may include a plurality pixel electrode and the image wire may include a plurality of image wires, whereas the plurality of position detection wires may be arranged so as to be lined up on one side of at least one image wire included in the plurality of image wires and to be interposed between pixel electrodes adjacent to each other, and each of the position detection electrodes may include a plurality of pixel electrode overlapping portions that overlap with at least the pixel electrode and are disposed so as to interpose the plurality of position detection wires, and a bridge portion that is disposed so as to cross the plurality of position detection wires and connects pixel electrode overlapping portions adjacent to each other.

(3) In the display device including a position input function, in addition to the above (2), the plurality of pixel electrodes may be arranged side by side on at least one side of the plurality of position detection wires arranged on the at least one side of the image wire, and the pixel electrode overlapping portions may be provided in a range straddling the plurality of pixel electrodes arranged on the at least one side of the plurality of position detection wires.

(4) In the display device including a position input function, in addition to the above (3), the display device may further include a color filter formed of a plurality of colored portions disposed so as to overlap with the pixel electrodes and exhibiting different colors from each other; a plurality of unit pixels formed of a set of a colored portion and a pixel electrode overlapping with the colored portion; and a plurality of display pixels formed of a plurality of unit pixels adjacent to each other and exhibiting different colors from each other, in which the plurality of position detection wires arranged on the at least one side of the image wire may be disposed so as to be interposed between the display pixels adjacent to each other.

(5) In the display device including a position input function, in addition to the above (2), the plurality of position detection wires may be arranged so as to be lined up on one side of each of the plurality of image wires.

(6) In the display device including a position input function, in addition to any of the above (2) to (5), in the plurality of position detection wires arranged on the at least one side of the image wire, at least one of the position detection wires may be connected to a bridge portion overlapping with the position detection wire.

(7) In the display device including a position input function, in addition to any of the above (1) to (6), the plurality of position detection wires arranged on the at least one side of the image wire may be disposed so that a formation range in an arrangement direction of the position detection wires is narrower than a formation range in an arrangement direction of the pixel electrode.

(8) In the display device including a position input function, in addition to any of the above (1) to (7), the display device may further include a signal supply unit that is connected to one end portion of at least a plurality of position detection wires and supplies a signal, in which of the plurality of position detection wires arranged on the at least one side of the image wire, a position detection wire located far from the image wire and the pixel electrode may be configured so that a position detection electrode to be connected is located far from the signal supply unit, as compared with a position detection wire located close to the image wire and the pixel electrode.

(9) In the display device including a position input function, in addition to any of the above (1) to (8), three or more position detection wires may be arranged side by side on the at least one side of the image wire.

(10) In the display device including a position input function, in addition to any of the above (1) to (9), the display device may further include a signal supply unit that is connected to one end portion of at least a plurality of position detection wires and supplies a signal, in which the plurality of position detection wires arranged on the at least one side of the image wire may include at least a first position detection wire that is connected to a position detection electrode located close to the signal supply unit and a second position detection wire that is connected to a position detection electrode located far from the signal supply unit, and the second position detection wire may be longer than the first position detection wire, and may have a portion which is large in width and disposed on a side opposite to a signal supply unit side of a position detection electrode to be connected to the first position detection wire.

(11) In the display device including a position input function, in addition to the above (10), the pixel electrode may include a plurality pixel electrodes and the image wire may include a plurality of image wires, whereas a plurality of position detection wires may be arranged so as to be lined up in a set on one side of each of a plurality of image wires included in the plurality of image wires, and a plurality of first position detection wires and a plurality of second position detection wires constituting sets may be configured so that a sum of distances between position detection electrodes to be connected and the signal supply unit is equal to each other between each of the sets.

(12) In the display device including a position input function, in addition to any of the above (1) to (11), the pixel electrode may include a plurality of pixel electrodes and the image wire may include a plurality of image wires, whereas a plurality of position detection wires may be arranged so as to be lined up on one side of each of at least two image wires included in the plurality of image wires, and the display device may further include a dummy position detection wire that is disposed adjacent to any of the plurality of position detection wires arranged on the at least one side of the image wire and is not connected to a position detection electrode.

(13) In the display device including a position input function, in addition to any of the above (1) to (12), the display device may further include a light shielding portion that overlaps with the plurality of position detection wires arranged on the at least one side of the image wire and is formed in a range straddling the plurality of position detection wires to shield light.

(14) In the display device including a position input function, in addition to any of the above (1) to (13), the image wire may include a first image wire configuration unit and a second image wire configuration unit that is disposed so as to overlap with an upper layer side of the first image wire configuration unit with a first insulating film in between and is connected to the first image wire configuration unit via a first image wire contact hole formed as an opening in the first insulating film, whereas the position detection wire may include a first position detection wire configuration unit that is located in a layer identical with a layer of the first image wire configuration unit, and a second position detection wire configuration unit that is located in a layer identical with a layer of the second image wire configuration unit, is disposed so as to overlap with the first image wire configuration unit, and is connected to the first image wire configuration unit via a first position detection wire contact hole formed as an opening in the first insulating film.

(15) In the display device including a position input function, in addition to the above (14), the pixel electrode may be disposed on an upper layer side of the second image wire configuration unit and the second position detection wire configuration unit with a second insulating film in between, and the image wire may include a third image wire configuration unit that is located in a layer identical with a layer of the pixel electrode, is disposed so as to overlap with the second image wire configuration unit, and is connected to the second image wire configuration unit via a second image wire contact hole formed as an opening in the second insulating film, whereas the position detection wire may include a third position detection wire configuration unit that is located in a layer identical with the layer of the pixel electrode, is disposed so as to overlap with the second position detection wire configuration unit, and is connected to the second position detection wire configuration unit via a second position detection wire contact hole formed as an opening in the second insulating film.

Advantageous Effects of Disclosure

According to the technique described in the specification of the present application, the sensitivity related to position detection can be improved.

DESCRIPTION OF EMBODIMENTS

Embodiment 1

Embodiment 1 will be described with reference to FIGS. 1 to 10. In the present embodiment, a liquid crystal display device (display device including a position input function) 10 having a display function and a touch panel function (position input function) will be illustrated. The X-axis, Y-axis, and Z-axis are illustrated in a portion of each drawing, and each axis direction is drawn so as to be the direction illustrated in each drawing. Upper sides of FIGS. 4, 5, 6, 7, and 8 are front sides, and lower sides of the drawings are back sides.

Figure 1:
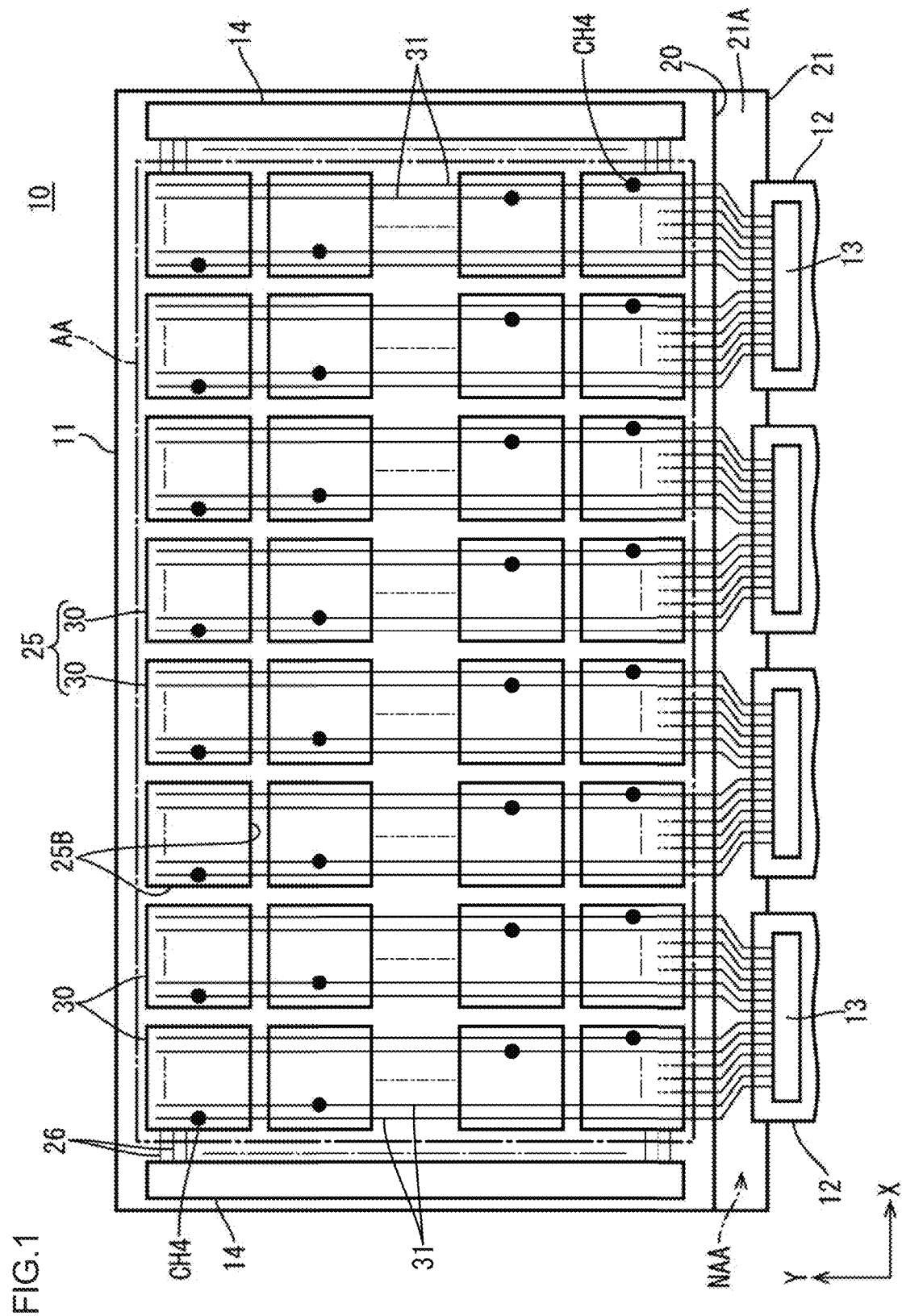
FIG. 1 is a plan view schematically illustrating a touch electrode, a touch wire, and the like of a liquid crystal panel provided in a liquid crystal display device according to Embodiment 1.

FIG. 1 is a schematic plan view of a liquid crystal panel 11. As illustrated in FIG. 1, the liquid crystal display device 10 is provided with at least the liquid crystal panel (display panel) 11 which has a horizontally long rectangular shape and can display an image, and a backlight device (lighting device) as an external light source that irradiates the liquid crystal panel 11 with light for display. The backlight device is disposed on the back side (rear surface side) of the liquid crystal panel 11 and includes a light source (for example, an LED) that emits white light, an optical member that converts the light from the light source into planar light by applying an optical action to the light.

As illustrated in FIG. 1, the liquid crystal panel 11 has a display region (range surrounded by a one-dot chain line in FIG. 1) AA on which an image is displayed at a central portion of a screen. On the other hand, a picture-frame shaped outer peripheral side portion surrounding the display region AA on the screen of the liquid crystal panel 11 is a non-display region NAA on which the image is not displayed. The liquid crystal panel 11 is formed by laminating a pair of substrates 20 and 21.

Of the pair of substrates 20 and 21, a front side (front surface side) is a CF substrate (opposing substrate) 20, and a back side (rear surface side) is an array substrate (active matrix substrate, element substrate) 21. Both the CF substrate 20 and the array substrate 21 are formed by laminating various films on the inner surface side of a glass substrate.

A polarizing plate is attached to each of the outer surfaces of the substrates 20 and 21.

As illustrated in FIG. 1, the CF substrate 20 has a short side dimension shorter than the short side dimension of the array substrate 21, whereas the CF substrate 20 is attached to the array substrate 21 so that one end portion in the short side direction (Y-axis direction) is aligned. Therefore, the other end portion of the short side direction of the array substrate 21 is a CF substrate non-overlapping portion 21A that protrudes laterally toward the CF substrate 20 and is non-overlapped with the CF substrate 20. A flexible substrate 12 is mounted on the CF substrate non-overlapping portion 21A by film on glass (FOG). The flexible substrate 12 has a configuration in which multiple wiring patterns are formed on a substrate formed of a synthetic resin material having insulating properties and flexibility (for example, polyimide resin or the like). One end of the flexible substrate 12 is connected to the CF substrate non-overlapping portion 21A, which is the non-display region NAA of the liquid crystal panel 11, and the other end is connected to a control substrate (signal supply source), respectively. Various signals supplied from the control substrate are transmitted to the liquid crystal panel 11 via the flexible substrate 12. In the present embodiment, four flexible substrates 12 are arranged side by side at intervals along the X-axis direction in the non-display region NAA of the liquid crystal panel 11. A driver (signal supply unit) 13 for supplying various signals related to a display function and a touch panel function described below is mounted on the flexible substrate 12 by chip on film (COF). The driver 13 is formed of an LSI chip having a drive circuit inside, is mounted on the array substrate 21 by chip on glass (COG), and processes various signals supplied from the control substrate. In the non-display region NAA of the array substrate 21, a pair of gate circuit units 14 is provided so as to interpose the display region AA from both sides in the X-axis direction.

The gate circuit unit 14 is for supplying a scanning signal to a gate wire 26 described later, and is monolithically provided on the array substrate 21.

The liquid crystal panel 11 according to the present embodiment has both a display function for displaying an image and a touch panel function for detecting a position (input position) to be input by the user based on a displayed image, and integrates (in-cells) a touch panel pattern for exerting the touch panel function of these functions. The touch panel pattern is a so-called projection type capacitance method, and the detection method is a self-capacitance method. As illustrated in FIG. 1, the touch panel pattern includes a plurality of touch electrodes (position detection electrodes) 30 arranged side by side in a matrix on the plate surface of the liquid crystal panel 11. A touch electrode 30 is disposed in the display region AA of the liquid crystal panel 11. Therefore, the display region AA of the liquid crystal panel 11 substantially coincides with a touch region (position input region) where the input position can be detected, and the non-display region NAA substantially coincides with a non-touch region (non-position input region) where the input position cannot be detected. When a finger (position input body), which is a conductor, is brought close to a front surface (display surface) of the liquid crystal panel 11 in an attempt to input a position based on the image of the display region AA of the liquid crystal panel 11 visually recognized by the user, a capacitance is formed between the finger and the touch electrode 30. As a result, since the capacitance detected by the touch electrode 30 located near the finger changes as the finger approaches and is different from that of the touch electrode 30 located far from the finger, the input position can be detected based on the capacitance.

A plurality of touch electrodes 30 are arranged side by side at intervals in a matrix along the X-axis direction (arrangement direction of a plurality of touch wires 31) and the Y-axis direction (extending direction of touch wire 31) in the display region AA. The touch electrode 30 has a substantially rectangular shape when viewed in a plane, and has a side dimension of approximately several mm (for example, approximately 2 mm to 9 mm). The size of the touch electrode 30 when viewed in a plane is much larger than that of a unit pixel UPX described later, and the touch electrodes 30 are disposed in a range straddling a plurality of (for example, approximately several tens) unit pixels UPX in the X-axis direction and the Y-axis direction. A plurality of touch wires (position detection wires) 31 provided on the liquid crystal panel 11 are selectively connected to the plurality of touch electrodes 30. The touch wire 31 extends along the Y-axis direction and is selectively connected to a specific touch electrode 30 of the plurality of touch electrodes 30 arranged along the Y-axis direction. In FIG. 1, the connection portion of the touch wire 31 to the touch electrode 30 (touch electrode contact hole CH4 described later) is illustrated by a black circle. Furthermore, the touch wire 31 is connected to a detection circuit. The detection circuit may be provided in the driver 13, and may be provided outside the liquid crystal panel 11 via the flexible substrate 12. FIG. 1 schematically illustrates the arrangement of the touch electrodes 30, and the specific number of installation, arrangement, planar shape, and the like of the touch electrodes 30 can be appropriately changed other than those illustrated in the drawing.

Figure 2:
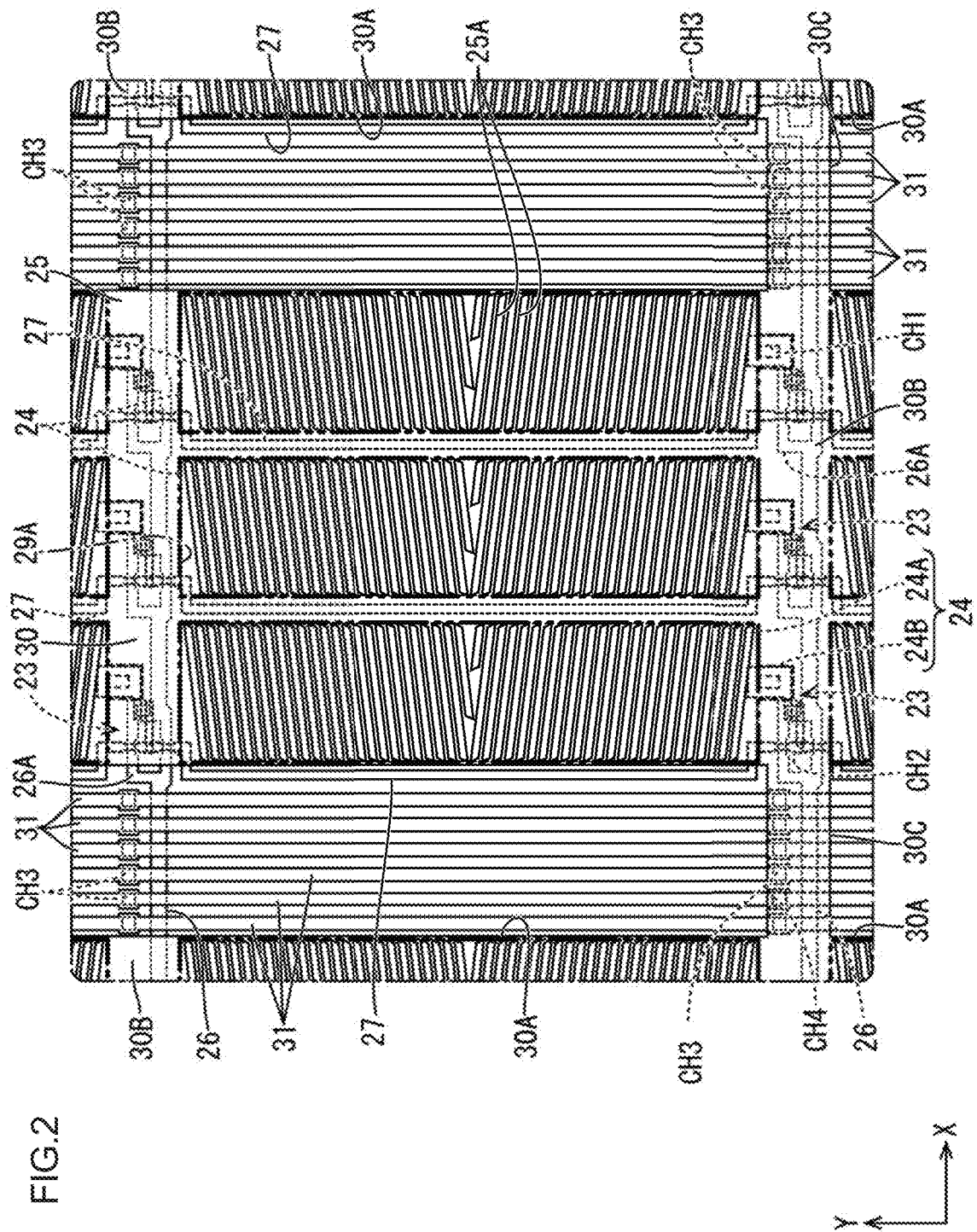
FIG. 2 is a plan view illustrating a pixel arrangement of the liquid crystal panel.

FIG. 2 is a plan view illustrating a pixel arrangement of the liquid crystal panel 11. As illustrated in FIG. 2, a thin film transistor (TFT, switching element) 23 and a pixel electrode 24 are provided on the inner surface side of the display region AA of the array substrate 21 constituting the liquid crystal panel 11. A plurality of TFTs 23 and a plurality of pixel electrodes 24 are provided side by side in a matrix shape at intervals along the X-axis direction and the Y-axis direction. Around these TFTs 23 and pixel electrodes 24, a gate wire (scanning wiring) 26 and a source wire (image wire, data wiring) 27 that are orthogonal (intersect) to each other are disposed. The gate wire 26 extends substantially along the X-axis direction, whereas the source wire 27 extends substantially along the Y-axis direction. The gate wire 26 is arranged so as to be alternately and repeatedly lined up with the pixel electrodes 24 in the Y-axis direction, whereas the source wire 27 is arranged so as to be alternately and repeatedly lined up with the pixel electrodes 24 in the X-axis direction. The gate wire 26 has an annular portion 26A forming a horizontally long rectangular annular portion when viewed in a plane at a portion intersecting with the source wire 27. In the annular portion 26A, since a pair of portions extending along the X-axis direction overlaps with the source wire 27, respectively, even in a case where a short circuit occurs between any one of the overlapping portions, a short-circuited portion can be separated from the gate wire 26 by laser irradiation or the like. A portion of the source wire 27 that intersects with the gate wire 26 is bent in a crank shape so as to approach the TFT 23.

The gate wire 26 and the source wire 27 are connected to a gate electrode 23A and a source electrode 23B of the TFT 23, respectively, and the pixel electrode 24 is connected to a drain electrode 23C of the TFT 23. Of these, the source electrode 23B is connected to the source wire 27 in the vicinity of the center of the annular portion 26A in the gate wire 26. The TFT 23 is driven based on various signals supplied to the gate wire 26 and the source wire 27, respectively, and controls the supply of the potential to the pixel electrode 24 in accordance with the driving. A light shielding portion (black matrix) 29 illustrated by a two-dot chain line in FIG. 2 is formed on the CF substrate 20 side. The light shielding portion 29 has a substantially grid-like planar shape so as to partition between the pixel electrodes 24 adjacent to each other, and has a pixel opening portion 29A at a position overlapping with most of the pixel electrodes 24 when viewed in a plane. It is possible to emit the transmitted light of the pixel electrode 24 to the outside of the liquid crystal panel 11 by the pixel opening portion 29A. The light shielding portion 29 is disposed so as to overlap with at least the gate wire 26 and the source wire 27 on the array substrate 21 side when viewed in a plane. A connection structure of the TFT 23 and the pixel electrode 24 will be described later.

Subsequently, the common electrode 25 will be described with reference to FIGS. 1 and 2. As illustrated in FIG. 2, on the inner surface side of the array substrate 21 in the display region AA, a common electrode 25 is formed on the upper layer side of the pixel electrode 24 (front side in the normal direction of the paper surface) so as to overlap with all the pixel electrodes 24. The common electrode 25 is normally supplied with a substantially constant base potential, and extends over substantially the entire display region AA. A plurality of pixel overlapping opening portions (pixel overlapping slit, alignment control slit) 25A extending along the long side direction of each pixel electrode 24 are formed as openings in the portion overlapping with each pixel electrode 24 (details will be described later in the pixel electrode body 24A). When a potential difference occurs between the pixel electrodes 24 and the common electrodes 25 overlapped with each other as the pixel electrodes 24 are charged, a fringe electric field (diagonal electric field) including a component in the normal direction to the plate surface of the array substrate 21 is generated between an opening edge of the pixel overlapping opening portion 25A and the pixel electrode 24, in addition to a component along the plate surface of the array substrate 21. Therefore, an alignment state of the liquid crystal molecules contained in the liquid crystal layer 22 described later can be controlled by using the fringe electric field. That is, the operation mode of the liquid crystal panel 11 according to the present embodiment is a fringe field switching (FFS) mode. The specific number of installation, shape, formation range, and the like of the pixel overlapping opening portion 25A can be appropriately changed other than those illustrated in the drawing.

The common electrode 25 constitutes the touch electrode 30 illustrated in FIG. 1. In addition to the pixel overlapping opening portion 25A described above, the common electrode 25 includes a partition opening portion (partition slit) 25B that partitions between the touch electrodes 30 adjacent to each other as illustrated in FIG. 1. The partition opening portion 25B includes a portion that crosses the entire length of the common electrode 25 along the X-axis direction and a portion that traverses the entire length of the common electrode 25 along the Y-axis direction, and has a substantially grid shape when viewed in a plane as a whole. The common electrode 25 includes a plurality of touch electrodes 30 which are divided into a grid shape when viewed in a plane by the partition opening portion 25B and are electrically independent of each other. Therefore, the touch wire 31 connected to the touch electrode 30 supplies a base potential signal related to the display function and the touch signal (position detection signal) related to the touch function to the touch electrode 30 at different timings. Of these, the base potential signal is transmitted to all the touch wires 31 at the same timing, so that all the touch electrodes 30 serve as base potentials and function as the common electrode 25. The detailed configuration of the touch electrode 30 will be described later.

The configurations of the TFT 23 and the pixel electrode 24 will be described in detail with reference to FIGS. 3 and 4.

Figure 3:
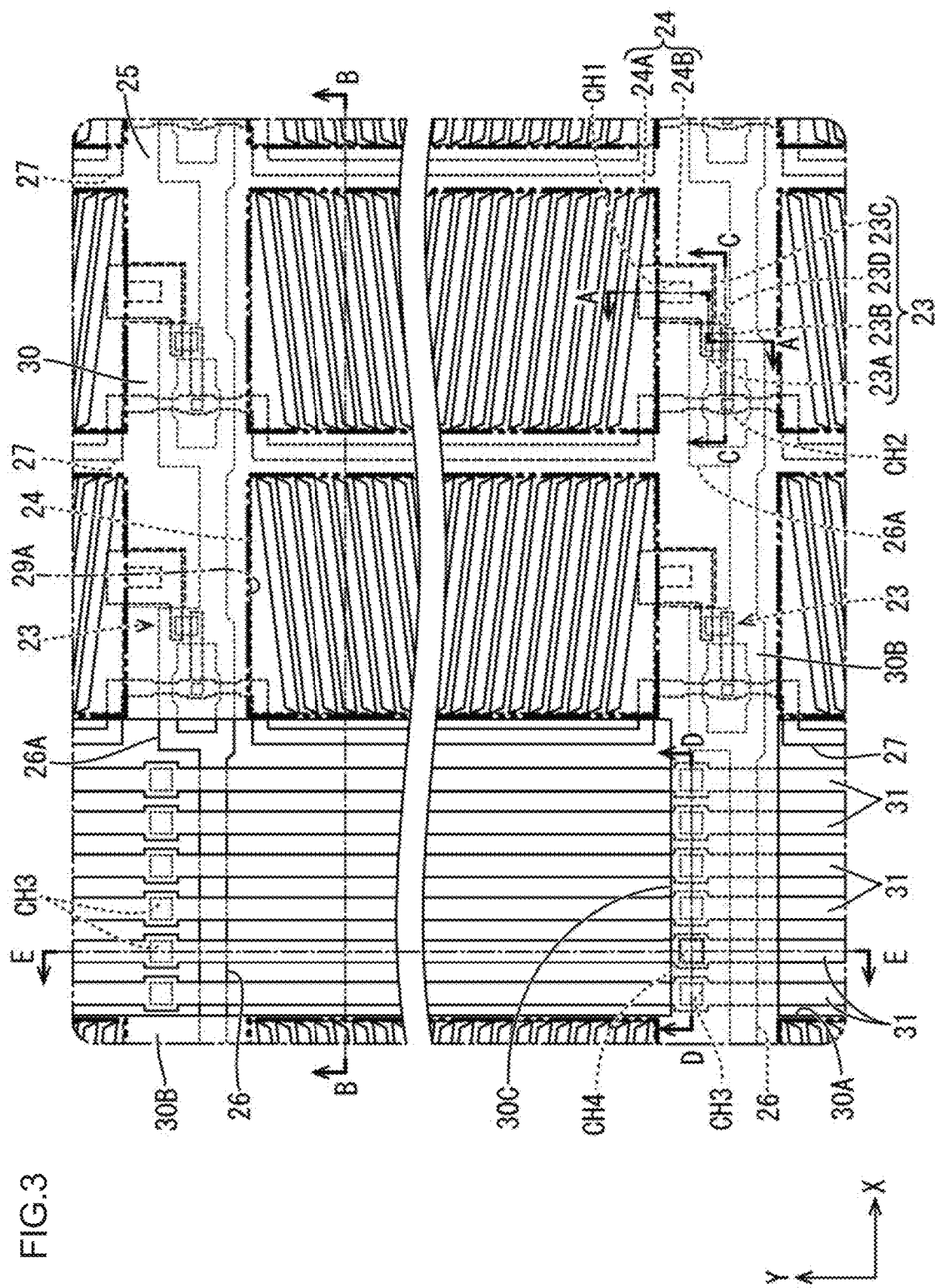
FIG. 3 is an enlarged plan view of a portion of FIG. 2 (the vicinity of the touch wire, the vicinity of the TFT, or the like) in the liquid crystal panel.

FIG. 3 is an enlarged plan view of the array substrate 21 in the vicinity of the TFT 23 and the like. FIG. 4 is a cross-sectional view of the array substrate 21 in the vicinity of TFT 23. As illustrated in FIGS. 3 and 4, the TFT 23 is disposed adjacent to the lower side illustrated in FIG. 3 in the Y-axis direction to the pixel electrode 24 to be connected. The TFT 23 includes a gate electrode 23A including a portion of the gate wire 26. The gate electrode 23A includes a portion of the annular portion 26A of the gate wire 26 extending along the Y-axis direction. The TFT 23 includes a source electrode 23B branched from the source wire 27. The source electrode 23B is branched and formed so as to extend from the crank-shaped portion of the source wire 27 toward the TFT 23 side along the X-axis direction. The source electrode 23B is disposed on one end side of the TFT 23 in the Y-axis direction, and a portion thereof overlaps with the gate electrode 23A and is connected to the channel portion 23D.

The TFT 23 includes a drain electrode 23C disposed at a position having an interval from the source electrode 23B, that is, on the other end side of the TFT 23 in the Y-axis direction. The drain electrode 23C has a bent shape so as to form a substantially L shape when viewed in a plane, and one end side thereof faces the source electrode 23B and overlaps with the gate electrode 23A and is connected to the channel portion 23D, whereas the other end side is connected to the pixel electrode 24.

As illustrated in FIG. 3, the pixel electrode 24 includes a vertically long rectangular pixel electrode body 24A overlapping with the pixel opening portion 29A of the light shielding portion 29, and a contact portion 24B protruding from the pixel electrode body 24A toward the TFT 23 along the Y-axis direction. Of these, the contact portion 24B is connected to the other end side of the drain electrode 23C. The TFT 23 includes a channel portion 23D overlapping with the gate electrode 23A with a gate insulating film 33 described later in between and connected to the source electrode 23B and the drain electrode 23C. The channel portion 23D overlaps with the gate electrode 23A and extends along the Y-axis direction, and one end side thereof is connected to the source electrode 23B and the other end side is connected to the drain electrode 23C. When the TFT 23 is turned on by supplying the scanning signal transmitted by the gate wire 26 to the gate electrode 23A, the image signal (data signal) transmitted by the source wire 27 is supplied from the source electrode 23B to the drain electrode 23C via the channel portion 23D. As a result, the pixel electrode 24 is charged to a potential based on the image signal.

Here, various films laminated and formed on the inner surface side of the array substrate 21 will be described with reference to FIGS. 4 and 5. FIG. 5 is a cross-sectional view illustrating a pixel arrangement in the liquid crystal panel 11. As illustrated in FIGS. 4 and 5, a first metal film 32, a gate insulating film 33, a semiconductor film 34, a second metal film 35, a first interlayer insulating film (first insulating film) 36, a third metal film 37, a flattening film (second insulating film) 38, a first transparent electrode film 39, a second interlayer insulating film (inter-electrode insulating film) 40, and a second transparent electrode film 41 are laminated and formed on the array substrate 21 in this order from the lower layer side (glass substrate side). The first metal film 32, the second metal film 35, and the third metal film 37 are formed of a single layer film formed of one type of metal material selected from copper, titanium, aluminum, molybdenum, tungsten, and the like, a laminated film formed of different types of metal materials, or an alloy, respectively, and thus have conductivity and light-shielding property.

The first metal film 32 constitutes the gate wire 26, the gate electrode 23A of the TFT 23, and the like. The second metal film 35 constitutes a portion of each of the source wire 27 and the touch wire 31, the source electrode 23B, the drain electrode 23C of the TFT 23, and the like. The third metal film 37 constitutes a portion of the source wire 27 and a portion of the touch wire 31, and the like. The semiconductor film 34 is formed of a thin film using, for example, an oxide semiconductor, amorphous silicon, or the like as a material, and constitutes the channel portion 23D or the like in the TFT 23. The first transparent electrode film 39 and the second transparent electrode film 41 are formed of a transparent electrode material (for example, indium tin oxide (ITO), indium zinc oxide (IZO), and the like). The first transparent electrode film 39 constitutes the pixel electrode 24 and the like. The second transparent electrode film 41 constitutes the common electrode 25 (touch electrode 30) and the like. The gate insulating film 33, the first interlayer insulating film 36, and the second interlayer insulating film 40 are formed of inorganic materials such as silicon nitride ($SiN_x$) and silicon oxide ($SiO_2$), respectively. The gate insulating film 33 keeps the first metal film 32 on the lower layer side and the semiconductor film 34 and the second metal film 35 on the upper layer side in an insulated state. The first interlayer insulating film 36 keeps the semiconductor film 34 and the second metal film 35 on the lower layer side and the third metal film 37 on the upper layer side in an insulated state. The second interlayer insulating film 40 keeps the first transparent electrode film 39 on the lower layer side and the second transparent electrode film 41 on the upper layer side in an insulated state.

The flattening film 38 is formed of an organic material such as acrylic resin (PMMA) and the film thickness is thicker than that of other insulating films 33, 36, and 40 formed of an inorganic material. The front surface of the array substrate 21 is flattened by the flattening film 38. The flattening film 38 keeps the third metal film 37 on the lower layer side and the first transparent electrode film 39 on the upper layer side in an insulated state.

As illustrated in FIG. 5, the liquid crystal panel 11 includes a liquid crystal layer (medium layer) 22 disposed between a pair of substrates 20 and 21 and containing liquid crystal molecules which are substances whose optical performance change with application of an electric field.

The liquid crystal layer 22 is sealed by being surrounded by a sealing portion interposed between the substrates 20 and 21. The display region AA on the inner surface side of the CF substrate 20 is provided with a color filter 28 formed of three colored portions 28R, 28G, and 28B exhibiting blue (B), green (G), and red (R). In the color filter 28, multiple colored portions 28R, 28G, and 28B exhibiting different colors from each other are repeatedly arranged along the gate wire 26 (X-axis direction), and the colored portions extend along the source wire 27 (normally in the Y-axis direction), so that the color filters 28 are arranged in a stripe shape as a whole. Each of the colored portions 28R, 28G, and 28B constituting the color filter 28 is disposed so as to overlap with each pixel electrode 24 on the array substrate 21 side when viewed in a plane. The colored portions 28R, 28G, and 28B adjacent to each other in the X-axis direction and exhibiting different colors from each other are disposed so that their boundaries (color boundaries) overlap with the source wire 27 and the light shielding portion 29. In the liquid crystal panel 11, the colored portions 28R, 28G, and 28B of R, G, and B arranged along the X-axis direction and the three pixel electrodes 24 facing the colored portions 28R, 28G, and 28B each constitute unit pixels (sub-pixel) UPX of three colors. In the liquid crystal panel 11, display pixel PX capable of color display of a predetermined gray scale is configured by unit pixels UPX of three colors of R, G, and B adjacent to each other along the X-axis direction. The light shielding portion 29 is disposed so as to partition between the colored portions 28R, 28G, and 28B adjacent to each other. On the upper layer side (liquid crystal layer 22 side) of the color filter 28, a flattening film disposed in a solid shape over substantially the entire area of the CF substrate 20 is provided. An alignment film for aligning the liquid crystal molecules contained in the liquid crystal layer 22 is formed on the innermost surface of both substrates 20 and 21 in contact with the liquid crystal layer 22, respectively.

Figure 4:
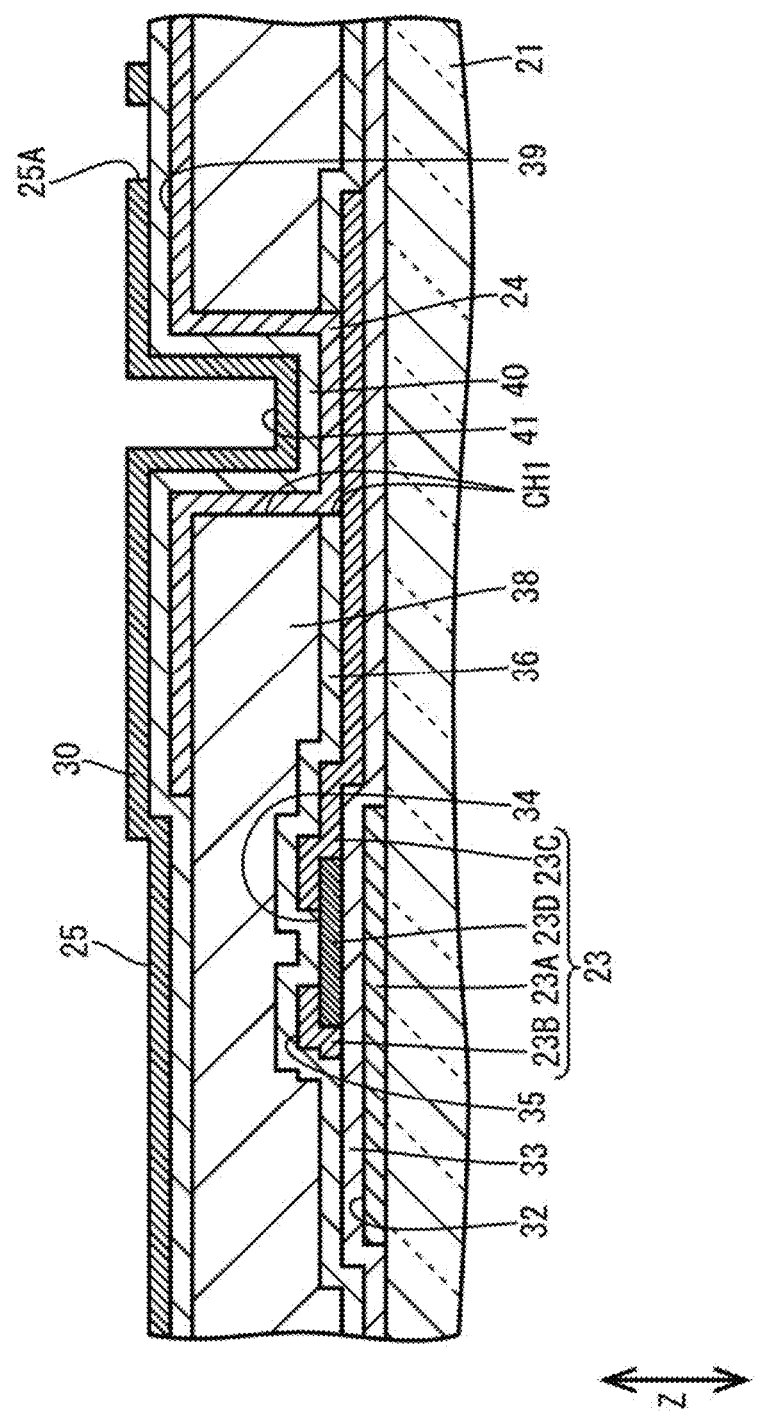
FIG. 4 is a cross-sectional view taken along line A-A of FIG. 3 in an array substrate.
Figure 5:
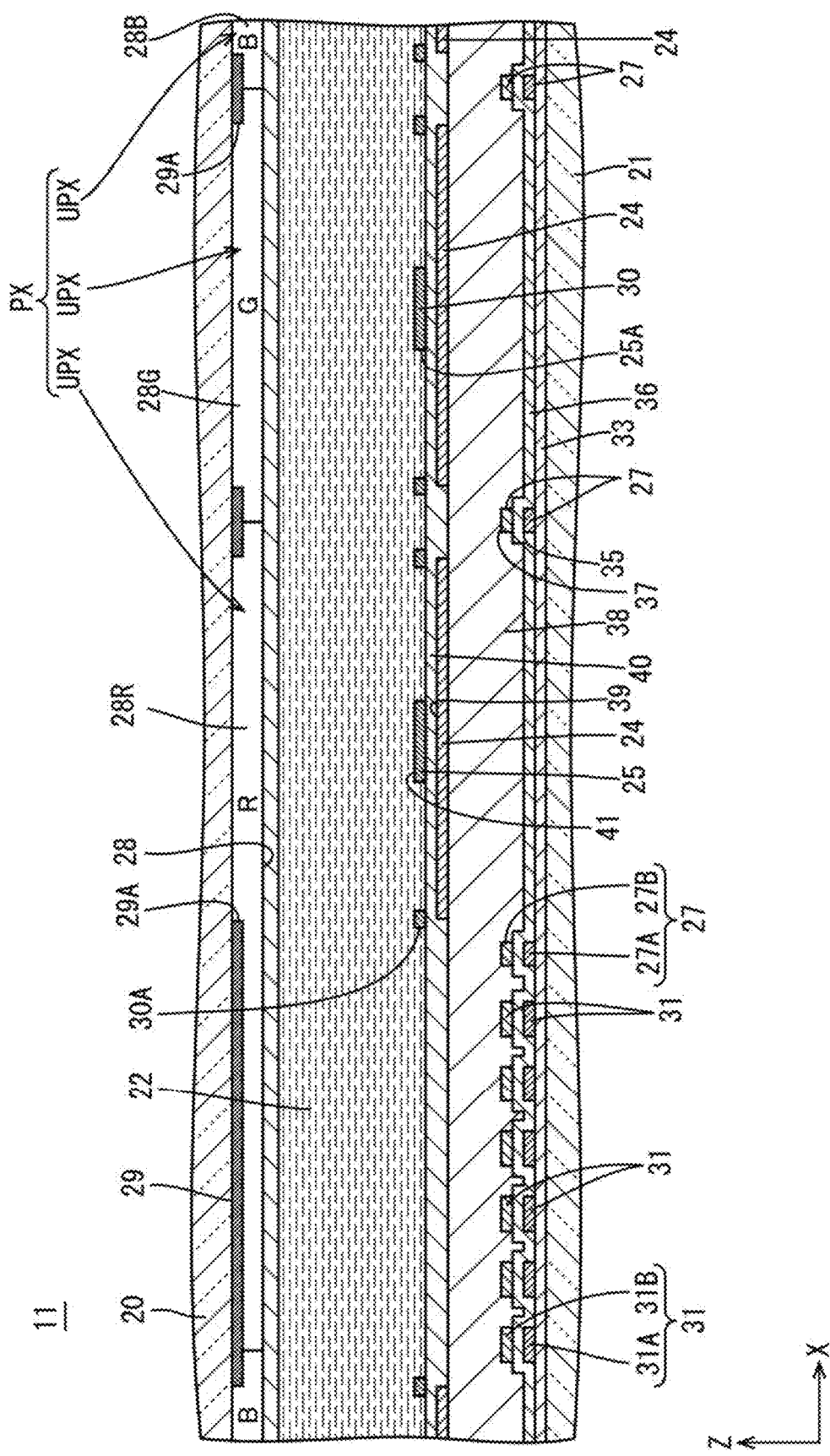
FIG. 5 is a cross-sectional view taken along line B-B of FIG. 3 in the array substrate.

As illustrated in FIG. 4, the source electrode 23B and the drain electrode 23C have a single-layer structure formed of the second metal film 35. A pixel contact hole CH1 for connecting the drain electrode 23C and the pixel electrode 24 is formed as an opening at a position overlapping with both the other end side portion of the drain electrode 23C and the contact portion 24B of the pixel electrode 24 of the first interlayer insulating film 36 and the flattening film 38.

On the other hand, the source wire 27 and the touch wire 31 each have a two-layer structure as illustrated in FIG. 5. The source wire 27 includes a first source wire configuration unit (first image wire configuration unit) 27A formed of the second metal film 35, and a second source wire configuration unit (second image wire configuration unit) 27B formed of the third metal film 37. The first source wire configuration unit 27A and the second source wire configuration unit 27B extend in parallel with each other, are disposed so as to overlap with each other with the first interlayer insulating film 36 in between, and have substantially the same width as each other. The touch wire 31 includes a first touch wire configuration unit (first position detection wire configuration unit) 31A formed of a second metal film 35 and located in the same layer as that of the first source wire configuration unit 27A, and a second touch wire configuration unit (second position detection wire configuration unit) 31B formed of a third metal film 37 and located in the same layer as that of the second source wire configuration unit 27B. The first touch wire configuration unit 31A and the second touch wire configuration unit 31B extend in parallel with each other, are disposed so as to overlap with each other with the first interlayer insulating film 36 in between, and have substantially the same width as each other.

Figure 6:
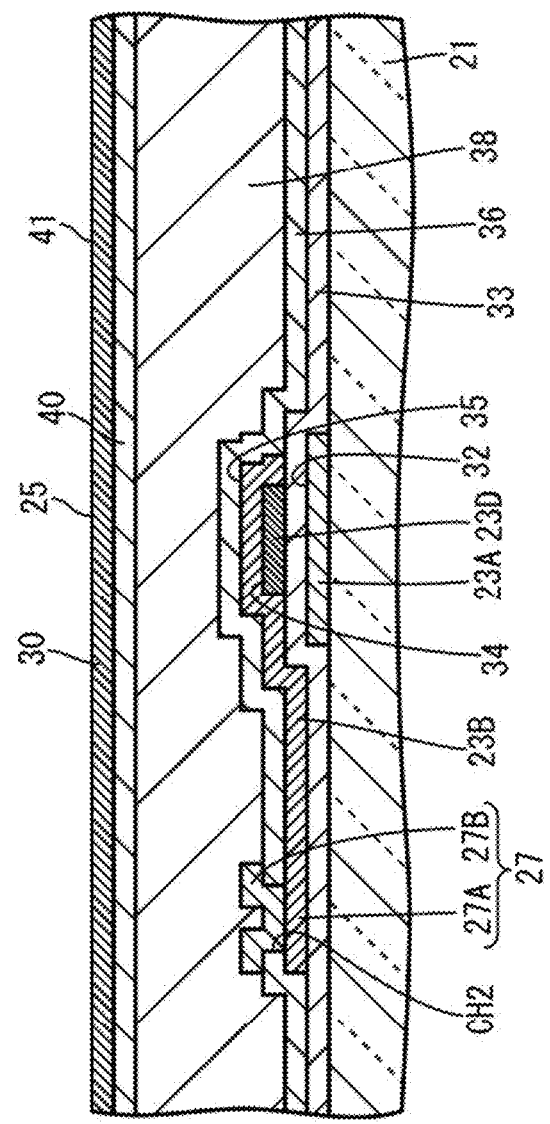
FIG. 6 is a cross-sectional view taken along line C-C of FIG. 3 in the array substrate.

FIG. 6 is a cross-sectional view of the array substrate 21 in the vicinity of the source electrode 23B constituting the TFT 23. As illustrated in FIG. 6, the source electrode 23B formed of the same second metal film 35 is connected to the first source wire configuration unit 27A constituting the source wire 27. A first source wire contact hole (first image wire contact hole) CH2 is formed as an opening at a position overlapping with a position where the first source wire configuration unit 27A and the source electrode 23B are connected to each other of the first interlayer insulating film 36. The first source wire configuration unit 27A on the lower layer side and the second source wire configuration unit 27B on the upper layer side are connected to each other via the first source wire contact hole CH2. The first source wire contact hole CH2 is provided at substantially all of the positions where a plurality of source electrode 23B provided in each of the plurality of TFTs 23 arranged along the Y-axis direction are connected to the first source wire configuration unit 27A. Therefore, the number of connection positions of the first source wire configuration unit 27A and the second source wire configuration unit 27B constituting the source wire 27 is the same as the number of arrangements of the TFTs 23 arranged along the Y-axis direction. According to such a configuration, even in a case where one of the first source wire configuration unit 27A and the second source wire configuration unit 27B is disconnected, when the other is not disconnected, the transmission of the image signal by the source wire 27 can be continued.

As a result, the source wire 27 can be made redundant and the wiring resistance can be reduced.

Figure 7:
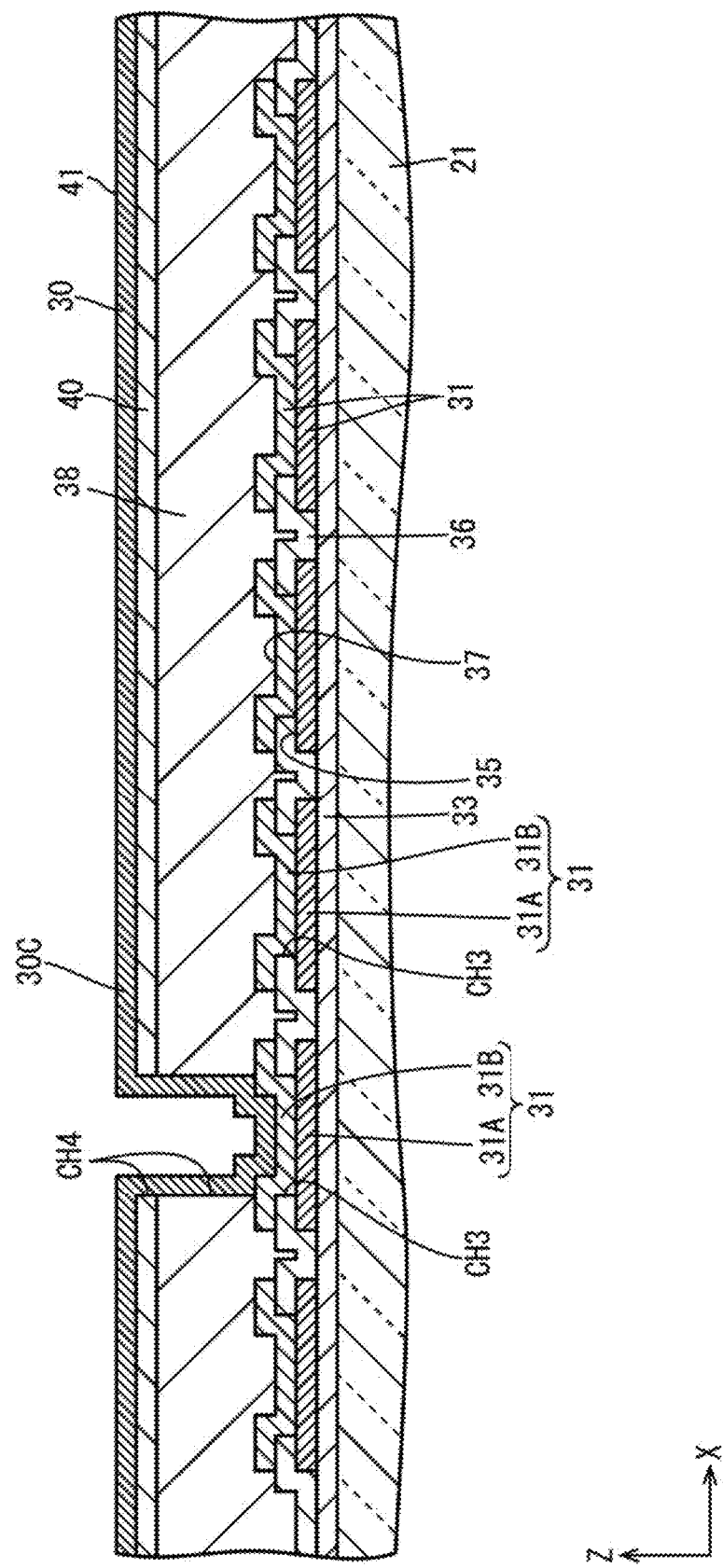
FIG. 7 is a cross-sectional view taken along line D-D of FIG. 3 in the array substrate.

FIG. 7 is a cross-sectional view of the array substrate 21 in the vicinity of a connection structure between the first touch wire configuration unit 31A and the second touch wire configuration unit 31B. As illustrated in FIG. 7, a first touch wire contact hole (first position detection wire contact hole) CH3 for connecting the first touch wire configuration unit 31A and the second touch wire configuration unit 31B is formed as an opening in the first interlayer insulating film 36. The first touch wire contact hole CH3 is disposed in the vicinity of an intersection portion with the gate wire 26 of the touch wires 31 extending along the Y-axis direction, and is disposed so as not to overlap with the gate wire 26. The first touch wire configuration unit 31A on the lower layer side and the second touch wire configuration unit 31B on the upper layer side are connected to each other via the first touch wire contact hole CH3. The first touch wire contact hole CH3 is provided in the vicinity of the intersection portions with all the gate wires 26 arranged along the Y-axis direction of the touch wires 31, respectively. Therefore, the number of connection positions of the first touch wire configuration unit 31A and the second touch wire configuration unit 31B constituting the touch wire 31 is the same as the number of arrangements of the gate wire 26 arranged along the Y-axis direction.

The first touch wire configuration unit 31A and the second touch wire configuration unit 31B are both partially widened in the vicinity of the first touch wire contact hole CH3, respectively. According to such a configuration, even in a case where one of the first touch wire configuration unit 31A and the second touch wire configuration unit 31B is disconnected, when the other is not disconnected, the transmission of the signal by the touch wire 31 can be continued. As a result, the touch wire 31 can be made redundant and the wiring resistance can be reduced. In particular, in a configuration in which many touch electrodes 30 are arranged along the extending direction of the touch wire 31, it is suitable when the length of the touch wire 31 tends to be increased. Moreover, since the first source wire configuration unit 27A and the first touch wire configuration unit 31A are located in the same layer, and the second source wire configuration unit 27B and the second touch wire configuration unit 31B are located in the same layer, the number of layers can be reduced.

Here, the arrangement of the touch wire 31 will be described with reference to FIGS. 3 and 5. As illustrated in FIGS. 3 and 5, a plurality of touch wires 31 according to the present embodiment are arranged side by side on one side of the specific source wire 27 in the X-axis direction. Specifically, six touch wires 31 are arranged so as to be lined up in succession on the left side illustrated in FIGS. 3 and 5 of a specific source wire 27 of the plurality of source wires 27, that is, a side opposite to the pixel electrode 24 side to be connected to the specific source wire 27 at a substantially constant interval. These six touch wires 31 are disposed so as to be interposed between the display pixels PX adjacent to each other in the X-axis direction. Therefore, only each of the source wires 27 is interposed between the three pixel electrodes 24 provided in the three unit pixels UPX constituting the display pixel PX, and the touch wire 31 is not interposed. That is, although the touch wires 31 are provided at a ratio of two to one unit pixel UPX, it can be said that the touch wires 31 are not disposed for each unit pixel UPX, and are collectively disposed for each display pixel PX. In the present embodiment, the ratio obtained by dividing the number of installations of the touch wires 31 by the number of arrangements of the unit pixels UPX in the X-axis direction in the display region AA is "2". This numerical value is substantially the same as the ratio obtained by dividing the number of arrangements of the touch electrodes 30 arranged along the Y-axis direction in the display region AA by the number of arrangements of the pixel electrodes 24 (unit pixel UPX) arranged along the X-axis direction in the formation range of one touch electrode 30. The pixel electrode 24 provided in the unit pixel UPX are arranged side by side three on one side or each three on both sides in succession in the X-axis direction with respect to the six touch wires 31 arranged on one side of the source wire 27, without interposing the touch wires 31 therebetween. Of the six touch wires 31 arranged in succession, the touch wires 31 located at the right ends illustrated in FIGS. 3 and 5 are disposed so as to be adjacent to the source wires 27 at intervals, whereas the touch wires 31 located at the left ends illustrated in 3 and FIG. 5 are disposed so as to be adjacent to the pixel electrode 24 at intervals. The interval between the touch wire 31 located at the left end and the source wire 27 is substantially the same as the interval between the touch wire 31 located at the right end and the pixel electrode 24.

As illustrated in FIGS. 3 and 5, the light shielding portion 29 provided on the CF substrate 20 are disposed so as to overlap with the six touch wires 31 collectively disposed in this manner when viewed in a plane. That is, the light shielding portion 29 is formed in a range straddling the six touch wires 31 in the X-axis direction, and a portion overlapping with a touch wire 31 group including the six touch wires 31 is wider than a portion overlapping with the source wire 27. Here, in the formation range of the six touch wires 31 arranged on one side of the source wire 27, an alignment state of the liquid crystal molecules contained in the liquid crystal layer 22 cannot be controlled, so that the display is not substantially contributed. In that respect, since the light shielding portion 29 collectively covers all of the six touch wires 31 arranged on one side of the source wire 27, for example, it is possible to prevent the display quality from being adversely affected by light leaking from between the touch wires 31 adjacent to each other. Moreover, since the six touch wires 31 arranged on one side of the source wire 27 constitute one display pixel PX and are prevented from interposing between the unit pixels UPX adjacent to each other, the three unit pixels UPX constituting the display pixel PX can be arranged at equal pitches, and the display quality is improved.

Figure 8:
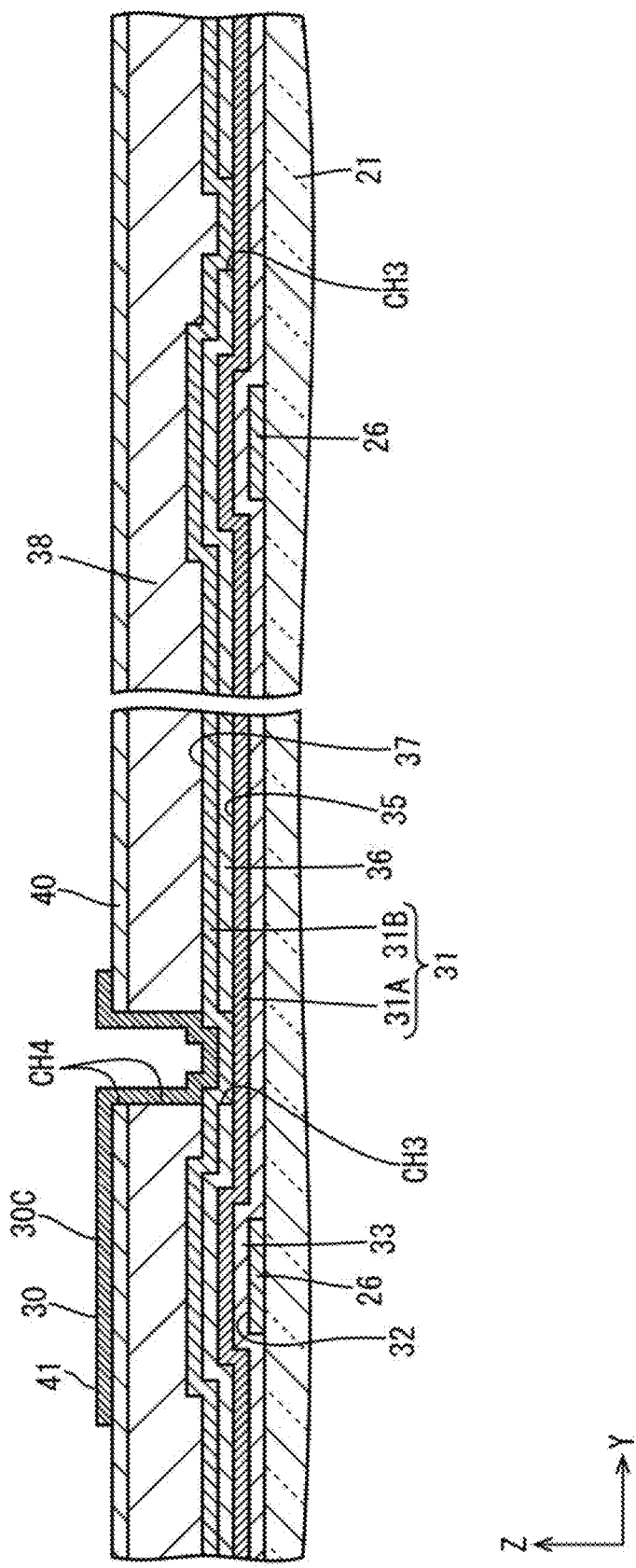
FIG. 8 is a cross-sectional view taken along line E-E of FIG. 3 in the array substrate.
Figure 9:
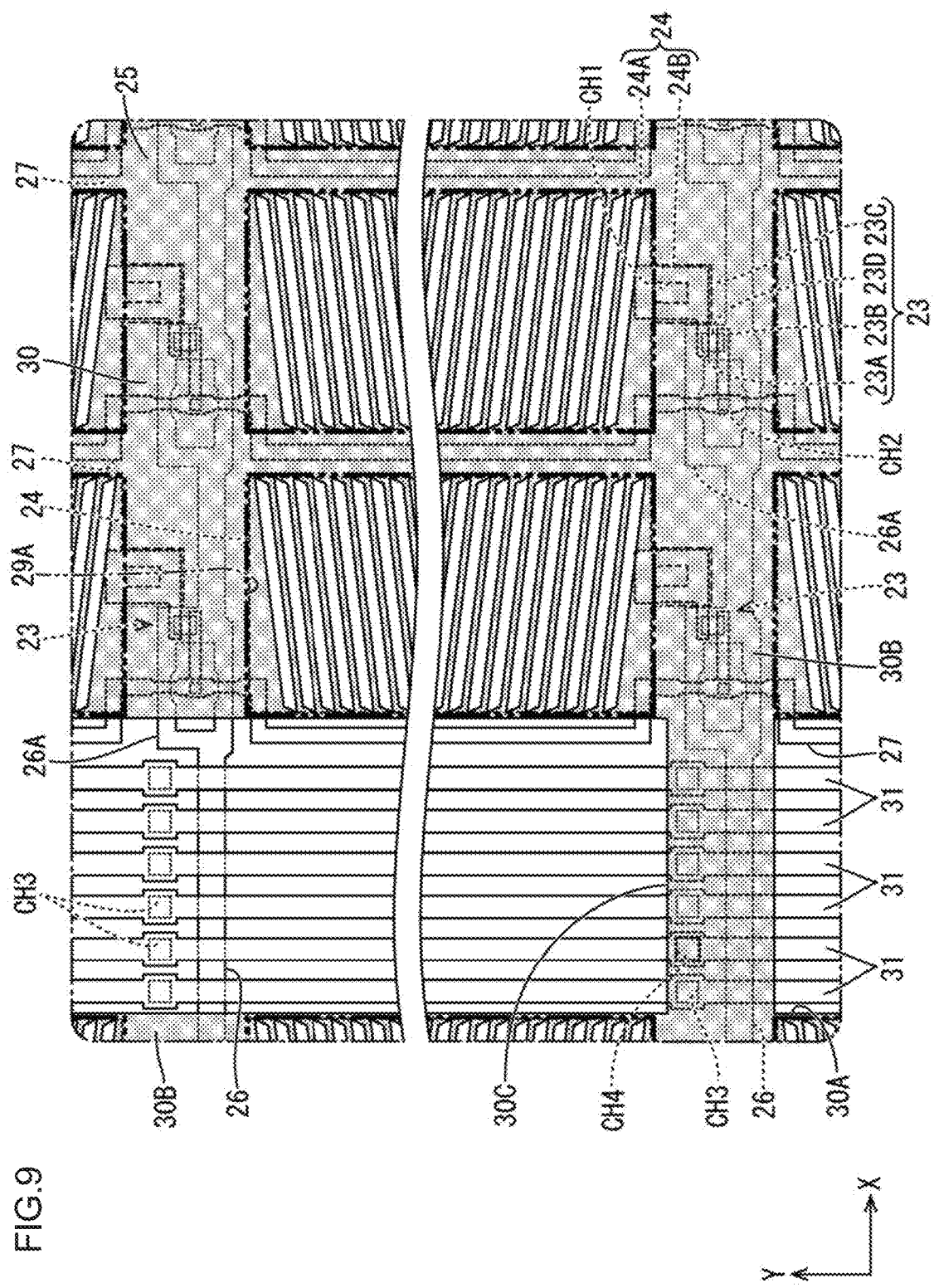
FIG. 9 is a plan view of the same range as that of FIG. 3, illustrating a pattern of a second transparent electrode film provided on the array substrate.

Subsequently, the detailed configuration of the touch electrode 30 will be described with reference to FIGS. 5, 7, 8 and 9 as appropriate. FIG. 8 is a cross-sectional view of the array substrate 21 cut along the touch wire 31. FIG. 9 is a plan view of the same range as that of FIG. 3, illustrating the pattern of the second transparent electrode film 41 (touch electrode 30) provided on the array substrate 21. In FIG. 9, the second transparent electrode film 41 is illustrated in a shaded shape. As illustrated in FIGS. 5 and 9, the touch electrode 30 according to the present embodiment includes an opening portion 30A that overlaps with the six touch wires 31 arranged on one side of the source wire 27 and is formed in a range straddling the six touch wires 31. The opening portion 30A has an opening width over the entire width of the touch wire 31 group including the six touch wires 31, and has a vertically elongated shape extending along the Y-axis direction which is the extending direction of the touch wires 31. Due to the opening portion 30A, the touch wire 31 group is collectively not overlapped with the touch electrode 30.

According to such a configuration, first, since the overlapping area between the touch electrode 30 and the touch wire 31 is reduced only by the opening area of the opening portion 30A, the parasitic capacitance that may occur between the touch wire 31 and the touch electrode 30 not connected to the touch wire 31 is reduced. In addition, the side edges of a positional relationship adjacent to each other of a pair of side edges in each touch wire 31 have a positional relationship farther from an opening edge of the opening portion 30A than the side edges of a positional relationship not adjacent to each other.

As a result, the electric field that can be generated between the side edges of the positional relationship adjacent to each other of the pair of side edges in each touch wire 31 and the opening edge of the opening portion 30A in the touch electrode 30 to which each touch wire 31 is not connected is reduced. From the above, since the parasitic capacitance that can occur between the touch wire 31 and the touch electrode 30 not connected to the touch wire 31 is further reduced, the sensitivity related to the position detection (touch detection) due to the parasitic capacitance is improved. In particular, in a configuration in which many touch electrodes 30 are arranged along the extending direction of the touch wire 31, since the touch wire 31 crosses many touch electrodes 30 not connected to the touch wire 31, signal dullness is likely to occur due to the parasitic capacitance, and since the length of the touch wire 31 is increased, the signal dullness is likely to occur due to the wiring resistance.

Therefore, it can be said that it is effective in improving the sensitivity related to the position detection that the parasitic capacitance is suitably alleviated by the opening portion 30A as described above. Furthermore, in the present embodiment, since the six touch wires 31 are arranged side by side on one side of the source wire 27, the four touch wires 31 excluding those located at both ends of the six touch wires 31 have a positional relationship in which any one of both side edges is separated from the opening edge of the opening portion 30A by at least a distance of the width dimension of the touch wire 31 or more. As a result, as compared with the case where only two touch wires are arranged on one side of the source wire 27, the parasitic capacitance that can occur between the touch wire 31 and the touch electrode 30 not connected to the touch wire 31 is further reduced, and the sensitivity related to the position detection due to the parasitic capacitance is further improved.

As illustrated in FIGS. 7 to 9, the touch electrode 30 includes a plurality of pixel electrode overlapping portions 30B that are overlapped with at least the pixel electrodes 24 and are disposed so as to interpose the touch wire 31 group, and a bridge portion 30C disposed so as to cross the touch wire 31 group and connecting between the pixel electrode overlapping portions 30B adjacent to each other. In addition to the three pixel electrodes 24 provided in the three unit pixels UPX constituting the display pixel PX, the pixel electrode overlapping portion 30B is disposed so that the pixel electrodes 24 are overlapped with each of the gate wires 26, each of the source wire 27, and each of the TFTs 23 to be connected. That is, the pixel electrode overlapping portion 30B has a band shape in which the formation range in the X-axis direction substantially coincides with the same formation range of the display pixel PX and extends along the Y-axis direction. Therefore, the pixel electrode overlapping portions 30B are arranged so as to be arranged along the Y-axis direction and collectively overlap with a plurality of display pixels PX belonging to the same row. The bridge portion 30C has a horizontally long shape extending along the X-axis direction, and crosses all six touch wires 31 arranged on one side of the source wire 27. Both end portions of the bridge portion 30C in the extending direction are connected to the pixel electrode overlapping portions 30B adjacent to each other with the touch wire 30 group interposed therebetween. The bridge portion 30C is disposed so as to overlap with a specific gate wire 26 of a plurality of gate wires 26 arranged along the Y-axis direction. Therefore, the number of arrangements of the bridge portions 30C in the Y-axis direction is smaller than the number of gate wires 26 overlapping with the touch electrode 30. The width dimension (dimension in the Y-axis direction) of the bridge portion 30C is longer than the width dimension of the gate wire 26. The opening portion 30A is formed as an opening in a range surrounded by a plurality of pixel electrode overlapping portions 30B and a plurality of bridge portions 30C constituting the touch electrode 30. Therefore, since the opening portion 30A does not extend over the entire length with respect to the touch wire 31 group, it is possible to prevent the touch electrode 30 from being divided by the opening portion 30A. The arrangement of the opening portion 30A in the X-axis direction coincides with the arrangement of the touch wire 31 groups in the X-axis direction, is interposed between display pixels PX adjacent to each other in the X-axis direction, and is overlapped with the light shielding portion 29.

As illustrated in FIGS. 7 and 8, the touch wire 31 is connected to the bridge portion 30C of the touch electrode 30 to be connected. Specifically, a touch electrode contact hole (position detection electrode contact hole) CH4 is formed as an opening in the flattening film 38 and the second interlayer insulating film 40 interposed therebetween at a position where both the second touch wire configuration unit 31B constituting the touch wire 31 included in the six touch wires 31 arranged on one side of the source wire 27, and the bridge portion 30C in the touch electrode 30 to which the touch wire 31 is connected overlap with each other. The second touch wire configuration unit 31B formed of the second metal film 35 and the bridge portion 30C formed of the second transparent electrode film 41 are connected to each other via the touch electrode contact hole CH4. The touch electrode contact hole CH4 is disposed at a position overlapping with the first touch wire contact hole CH3 for connecting the first touch wire configuration unit 31A and the second touch wire configuration unit 31B. The touch electrode contact hole CH4 is disposed at a position overlapping with the bridge portion 30C and not overlapping with the gate wire 26. As described above, the touch wire 31 and the touch electrode 30 to be connected to the touch wire 31 can be connected by using the bridge portion 30C connecting the pixel electrode overlapping portions 30B adjacent to each other. Therefore, as compared with the case where the touch wire is connected to the pixel electrode overlapping portion 30B, the configuration can be simplified.

Figure 10:
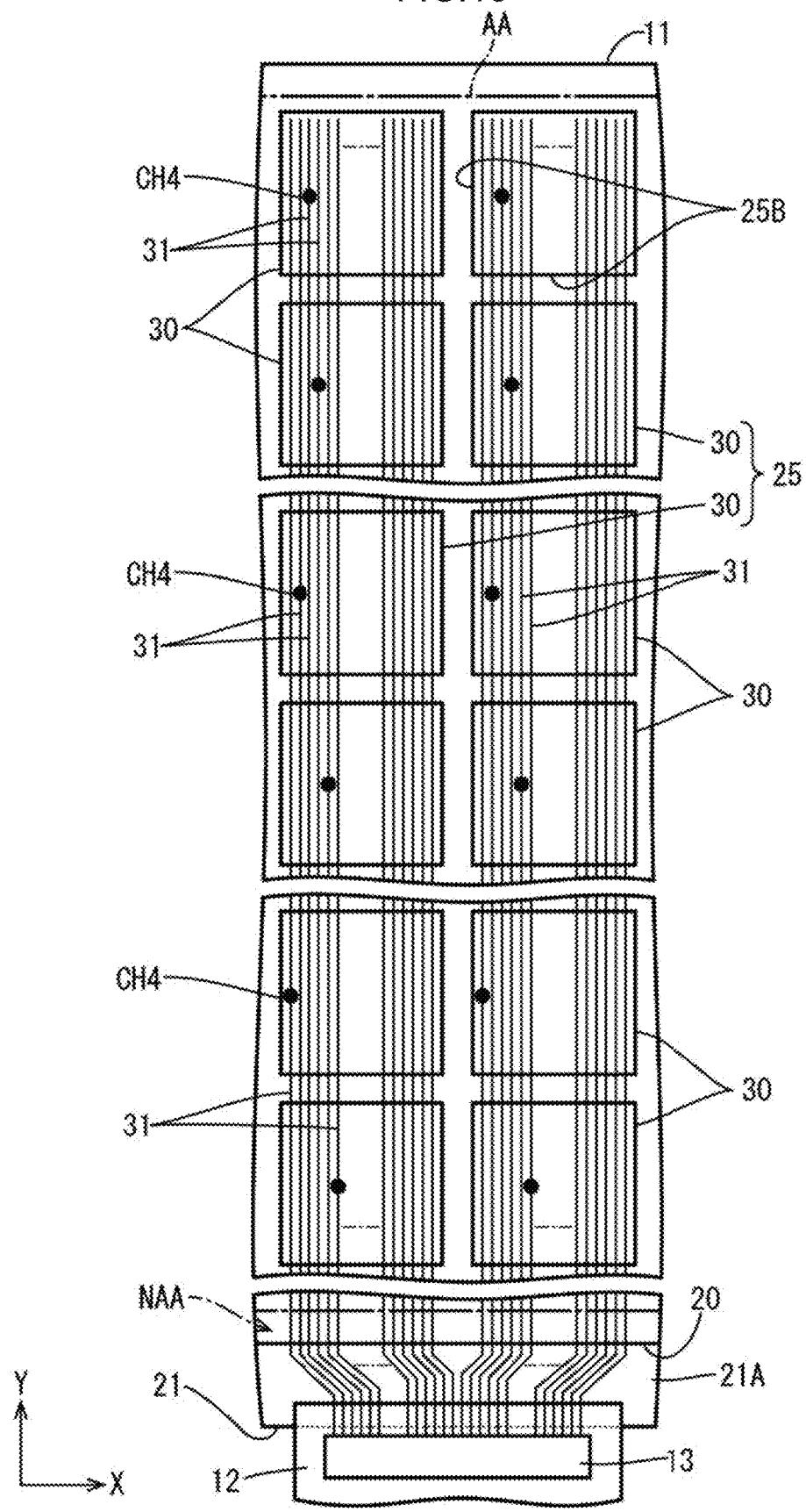
FIG. 10 is a plan view schematically illustrating a connection relationship between a touch electrode and a touch wire in the liquid crystal panel.

Next, the connection relationship between the six touch wires 31 arranged on one side of the source wire 27 and the plurality of touch electrodes 30 arranged along the Y-axis direction will be described with reference to FIG. 10. FIG. 10 is a plan view schematically illustrating the connection relationship between the touch electrode 30 and the touch wire 31 in the liquid crystal panel 11. As illustrated in FIG. 10, of the six touch wires 31 arranged on one side of the source wire 27, the touch wire 31 located far from the source wire 27 and the pixel electrode 24 is configured so that the touch electrode 30 to be connected is located far from the driver 13, as compared with the touch wire 31 located close to the source wire 27 and the pixel electrode 24. Specifically, first, in the six touch wires 31 arranged on one side of the source wire 27, the two touch wires 31 located at both ends are located closest to the source wire 27 and the pixel electrode 24, whereas the two touch wires 31 located on the center side are located farthest from the source wire 27 and the pixel electrode 24. Furthermore, the two touch wires 31 located between the wires located at both ends and the wiring located on the center side are located second closest (far) to the source wire 27 and the pixel electrode 24. The magnitude of the parasitic capacitance that can occur between the touch wire 31 and the source wire 27 or the pixel electrode 24 depends on the positional relationship between the two components. When the positional relationship is close, the electric field generated between the two components is strong, so that the parasitic capacitance tends to increase, and when the positional relationship is far, the electric field generated between the two components is weak, so that the parasitic capacitance tends to decrease. On the other hand, the easiness of dullness of the signal supplied by each touch wire 31 to the six touch electrodes 30 to be connected to the six touch wires 31 arranged on one side of the source wire 27 depends on the positional relationship between the touch electrode 30 and the driver 13. When the positional relationship is close, the signal transmission distance is short, so that the signal tends to be unlikely to be dull, and when the positional relationship is far, the signal transmission distance is long, so that the signal tends to be likely to be dull.

On the other hand, the connection relationship between the six touch wires 31 arranged on one side of the source wire 27 and the six touch electrodes 30 to be connected to the six touch wires 31 is as follows. That is, the two touch wires 31 located at both ends of the six touch wires 31 are connected to the two touch electrodes 30 located farthest from the driver 13 in the Y-axis direction of the six touch electrodes 30. The two touch wires 31 located on the center side of the six touch wires 31 are connected to the two touch electrodes 30 located closest to the driver 13 in the Y-axis direction of the six touch electrodes 30. The two touch wires 31 located in the middle of the six touch wires 31 are connected to the two touch electrodes 30 located in the middle of the four touch electrodes 30 described above in the Y-axis direction of the six touch electrodes 30. As described above, the touch wire 31 that tends to have a small parasitic capacitance which can occur between the source wire 27 and the pixel electrode 24 is connected to the touch electrode 30 which is located far from the driver 13 and in which a signal dullness tends to be likely to occur, whereas the touch wire 31 which tends to have a large parasitic capacitance that can occur between the source wire 27 and the pixel electrode 24 is connected to the touch electrode 30 which is located close to the driver 13 and in which a signal dullness tends to be unlikely to occur. Therefore, the load acting on each touch wire 31 that transmits a signal to each touch electrode 30 having a different distance from the driver 13 is equalized. As a result, the sensitivity related to position detection is further improved.

As described above, the liquid crystal display device (display device including position input function) 10 of the present embodiment is provided with the pixel electrode 24, the source wire (image wire) 27 disposed adjacent to the pixel electrode 24 and supplying an image signal to the pixel electrode 24, the touch wire (position detection wire) 31 in which a plurality of wires are arranged side by side at least on one side of the source wire 27, and the plurality of touch electrodes (position detection electrodes) 30 that are connected to the plurality of touch wires 31, form a capacitance with a finger, which is a position input body for performing position input, to detect an input position by the finger, which is the position input body, and include the opening portion 30A which overlaps with the plurality of touch wires 31 arranged on at least one side of the source wire 27 and is formed in a range straddling the plurality of touch wires 31.

In this manner, the pixel electrode 24 is charged to a potential based on the image signal supplied by the source wire 27, whereby the display is made. The plurality of touch electrodes 30 form a capacitance with the finger, which is the position input body for performing position input, and detect an input position by the finger, which is the position input body, by using signals supplied by the plurality of touch wires 31. Incidentally, in a configuration in which many touch electrodes 30 are arranged along the extending direction of the touch wire 31, there is a concern that the sensitivity related to the position detection may deteriorate due to the parasitic capacitance generated between the touch wire 31 and the touch electrode 30 not connected to the touch wire 31 or the wiring resistance of the touch wire 31.

On the other hand, since the touch electrode 30 includes the opening portion 30A overlapping with the plurality of touch wires 31 arranged on at least one side of the source wire 27, the parasitic capacitance that may occur between the touch wire 31 and the touch electrode 30 not connected to the touch wire 31 is reduced by the amount of the opening portion 30A. Moreover, since the touch electrode 30 includes the opening portion 30A formed in a range straddling the plurality of touch wires 31 arranged on at least one side of the source wire 27, the side edges having a positional relationship adjacent to each other of the pair of side edges of each touch wire 31 are in a positional relationship far from the opening edge of the opening portion 30A, as compared with the side edges having a positional relationship not adjacent to each other. As a result, the electric field that can be generated between the side edges of the positional relationship adjacent to each other of the pair of side edges in each touch wire 31 and the opening edge of the opening portion 30A in the touch electrode 30 to which each touch wire 31 is not connected is reduced. From the above, since the parasitic capacitance that can occur between the touch wire 31 and the touch electrode 30 not connected to the touch wire 31 is further reduced, the sensitivity related to the position detection due to the parasitic capacitance is improved.

A plurality of the pixel electrodes 24 and a plurality of the source wires 27 are disposed, whereas the plurality of touch wires 31 are arranged on one side of at least one source wire 27 included in the plurality of source wires 27 and are interposed between pixel electrodes 24 adjacent to each other. The touch electrodes 30 include a plurality of pixel electrode overlapping portions 30B which are overlapped with at least the pixel electrodes 24 and are disposed so as to interpose the plurality of touch wires 31, and the bridge portion 30C disposed so as to cross the plurality of touch wires 31 and connecting between the pixel electrode overlapping portions 30B adjacent to each other. In this manner, the range surrounded by the plurality of pixel electrode overlapping portions 30B and the bridge portion 30C constituting the touch electrode 30 is the opening portion 30A. Since the opening portion 30A does not extend over the entire length of the plurality of touch wires 31, it is possible to prevent the touch electrode 30 from being divided by the opening portion 30A.

The plurality of pixel electrodes 24 are arranged side by side on at least one side of the plurality of touch wires 31 arranged on at least one side of the source wire 27. The pixel electrode overlapping portion 30B is provided in a range straddling the plurality of pixel electrodes 24 arranged on at least one side of the plurality of touch wires 31. In this manner, the touch wires 31 are more collectively disposed, in addition to widening the formation range of the pixel electrode overlapping portion 30B and reducing the number of bridge portions 30C, as compared with the case where the plurality of pixel electrode overlapping portions are overlapped with each of the plurality of pixel electrodes 24.

The color filter 28 formed of the plurality of colored portions 28R, 28G, and 28B disposed so as to overlap with the pixel electrode 24 and exhibiting different colors from each other, the plurality of unit pixels UPX formed of a set of colored portions 28R, 28G, and 28B overlapping with the pixel electrode 24, and the plurality of display pixels PX formed of the plurality of unit pixels UPX adjacent to each other and exhibiting different colors from each other are provided. The plurality of touch wires 31 arranged on at least one side of the source wire 27 are arranged so as to be interposed between the display pixels PX adjacent to each other. In this manner, it is possible to prevent the plurality of touch wires 31 arranged on at least one side of the source wire 27 from forming one display pixel PX and interposing between the unit pixels UPX adjacent to each other. As a result, the plurality of unit pixels UPX constituting the display pixel PX can be arranged at equal pitches, so that the display quality is improved.

The plurality of touch wires 31 arranged on at least one side of the source wire 27 are connected to the bridge portion 30C with which at least one touch wire 31 is overlapped. In this manner, it is possible to connect the touch wire 31 and the touch electrode 30 to be connected to the touch wire 31 by using the bridge portion 30C that crosses the plurality of touch wires 31 arranged on at least one side of the source wire 27.

The driver (signal supply unit) 13 connected to one end portion of at least the plurality of touch wires 31 to supply a signal is provided. Of the plurality of touch wires 31 arranged on at least one side of the source wire 27, the touch wire 31 located far from the source wire 27 and the pixel electrode 24 is configured so that the touch electrode 30 to be connected is located far from the driver 13, as compared with the touch wire 31 located close to the source wire 27 and the pixel electrode 24. In this manner, the signal is supplied from the driver 13 to the touch electrode 30 via the touch wire 31. Here, of the plurality of touch wires 31 at least arranged on one side of the source wire 27, the touch wire 31 located far from the source wire 27 and the pixel electrode 24 has a small parasitic capacitance that can occur between the source wire 27 and the pixel electrode 24, and the transmitted signal is unlikely to be dull, as compared with the touch wire 31 located close to the source wire 27 and the pixel electrode 24. On the other hand, since the touch electrode 30 located far from the driver 13 of the plurality of touch electrodes 30 has a long signal transmission distance by the touch wire 31, as compared with the touch electrode 30 located close to the driver 13, signal dullness due to the wiring resistance of the touch wire 31 is likely to occur. In that respect, since the touch electrode 30 to be connected to the touch wire 31 located far from the source wire 27 and the pixel electrode 24 is located far from the driver 13, as compared with the touch electrode 30 to which the position detection wire located close to the source wire 27 and the pixel electrode 24 is connected, the load acting on each touch wire 31 that transmits a signal to each touch electrode 30 having a different distance from the driver 13 is equalized.

Three or more touch wires 31 are arranged side by side on at least one side of the source wire 27. In this manner, of the three or more touch wires 31 arranged side by side, the touch wires 31 excluding those located at both ends have a positional relationship in which both side edges are at least separated from the opening edge of the opening portion 30A by at least the width dimension of the touch wire 31. As a result, as compared with the case where only two touch wires are arranged on at least one side of the source wire 27, the parasitic capacitance that may occur between the touch wire 31 and the touch electrode 30 not connected to the touch wire 31 is further reduced, and the sensitivity related to position detection due to the parasitic capacitance is further improved.

The light shielding portion 29 is provided that overlaps with the plurality of touch wires 31 arranged on at least one side of the source wire 27 and is formed in a range straddling the plurality of touch wires 31 to shield light. The formation range of the plurality of touch wires 31 arranged on at least one side of the source wire 27 does not substantially contribute to the display. On the other hand, since the light shielding portion 29 that shields light is formed in a range that overlaps with the plurality of touch wires 31 and straddles the plurality of touch wires 31, for example, it is possible to prevent the display quality from being adversely affected by light leaking from between the touch wires 31 adjacent to each other.

The source wire 27 includes the first source wire configuration unit (first image wire configuration unit) 27A, and the second source wire configuration unit (second image wire configuration unit) 27B disposed so as to overlap with the first source wire configuration unit 27A on the upper layer side with the first interlayer insulating film (first insulating film) 36 in between and connected to the first source wire configuration unit 27A via the first source wire contact hole (first image wire contact hole) CH2 formed as an opening in the first interlayer insulating film 36, whereas the touch wire 31 includes the first touch wire configuration unit (first position detection wire configuration unit) 31A located in the same layer as that of the first source wire configuration unit 27A, and the second touch wire configuration unit (second position detection wire configuration unit) 31B disposed so as to be located in the same layer as that of the second source wire configuration unit 27B and so as to overlap with the first source wire configuration unit 27A and connected to the first source wire configuration unit 27A via the first touch wire contact hole (first position detection wire contact hole) CH3 formed as an opening in the first interlayer insulating film 36. In this manner, since the source wire 27 includes the first source wire configuration unit 27A and the second source wire configuration unit 27B that are connected to each other via the first source wire contact hole CH2, even in a case where one of the first source wire configuration unit 27A and the second source wire configuration unit 27B is disconnected, the transmission of the image signal by the source wire 27 can be continued. Since the touch wire 31 includes the first touch wire configuration unit 31A and the second touch wire configuration unit 31B connected to each other via the first touch wire contact hole CH3, even in a case where one of the first touch wire configuration unit 31A and the second touch wire configuration unit 31B is disconnected, the transmission of the signal by the touch wire 31 can be continued. As described above, the source wire 27 and the touch wire 31 can be made redundant, and the wiring resistance can be reduced. In particular, in a configuration in which many touch electrodes 30 are arranged along the extending direction of the touch wire 31, it is suitable when the length of the touch wire 31 tends to be increased. Moreover, since the first source wire configuration unit 27A and the first touch wire configuration unit 31A are located in the same layer, and the second source wire configuration unit 27B and the second touch wire configuration unit 31B are located in the same layer, the number of layers can be reduced.

Embodiment 2

Embodiment 2 will be described with reference to FIG. 11 or FIG. 12. In Embodiment 2, the configuration in which the arrangement of the TFT 123, the source wire 127, and the touch wire 131 is changed is illustrated. Overlapping description of the same structure, action and effect as those in Embodiment 1 described above will be omitted.

Figure 11:
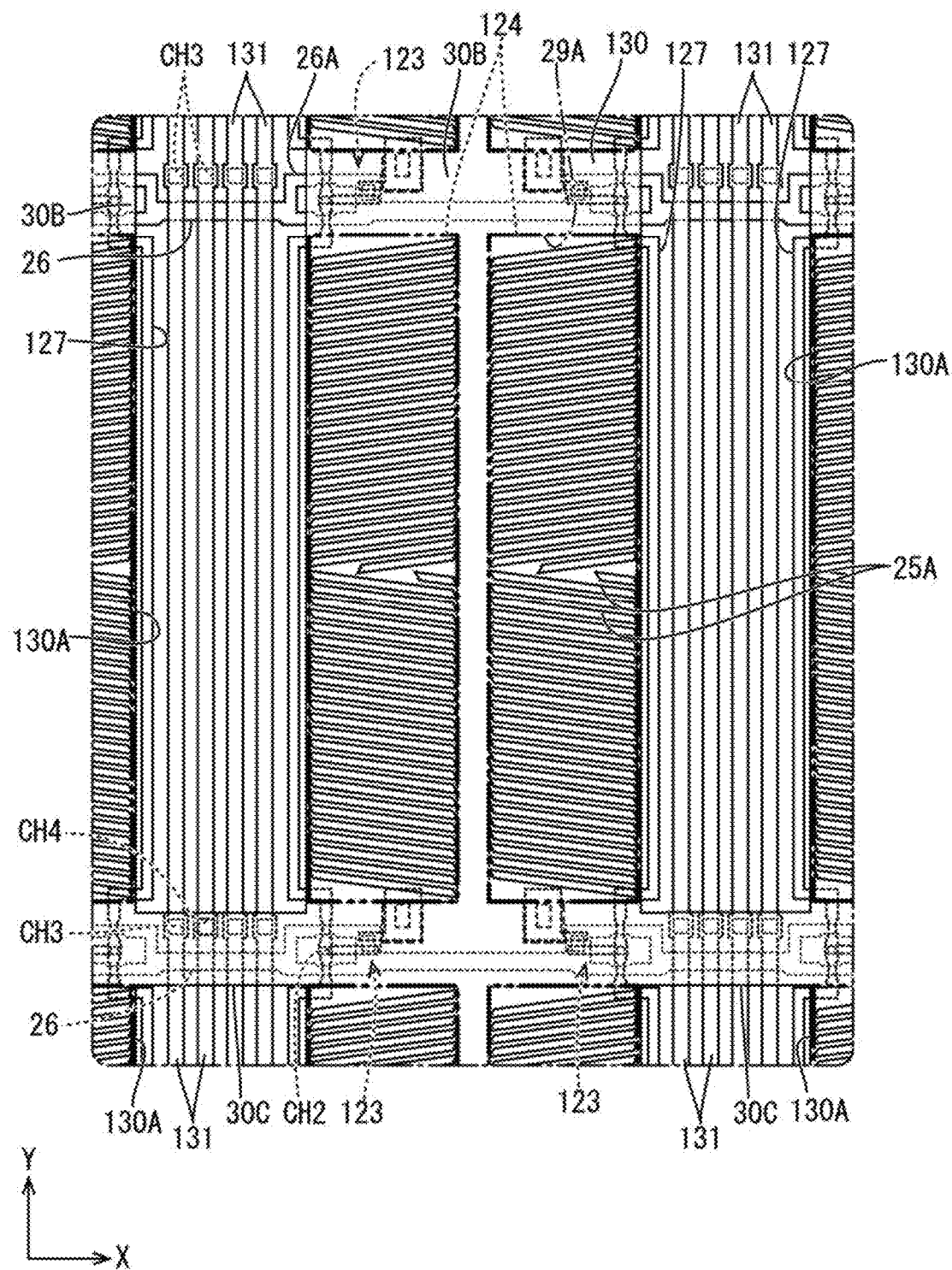
FIG. 11 is a plan view illustrating a pixel arrangement of a liquid crystal panel according to Embodiment 2.

FIG. 11 is a plan view illustrating the pixel arrangement of the liquid crystal panel. FIG. 12 is a plan view of the same range as that of FIG. 11 illustrating a pattern of the second transparent electrode film (touch electrode 130) provided on the array substrate.

Figure 12:
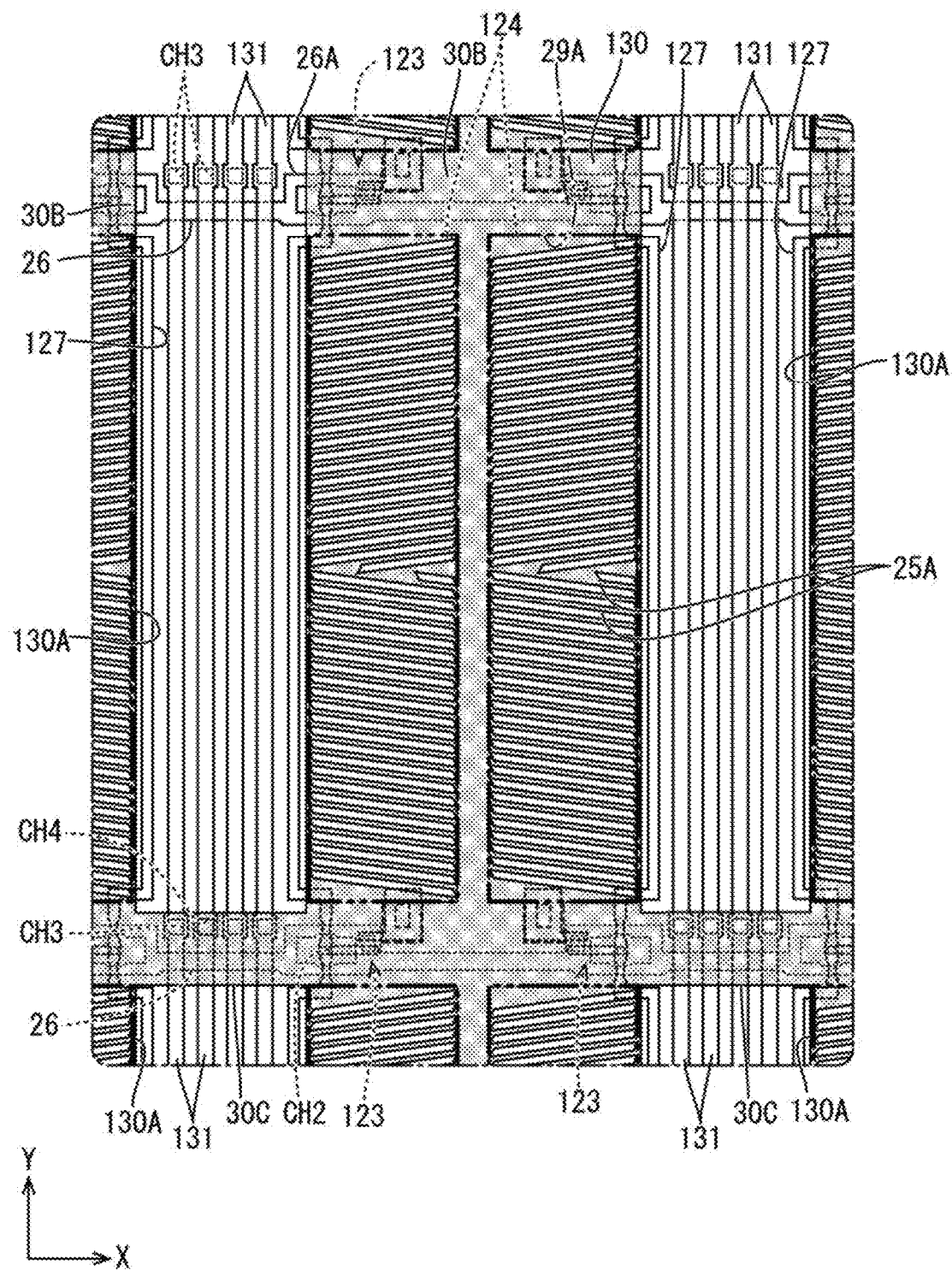
FIG. 12 is a plan view of the same range as that of FIG. 11 illustrating a pattern of a second transparent electrode film provided on an array substrate.

In FIG. 12, the touch electrode 130 formed of the second transparent electrode film is illustrated in a shaded shape. As illustrated in FIG. 11, the source wire 127 according to the present embodiment includes ones adjacent to each other on one side (for example, left side of FIG. 11) of the pixel electrode 124 in the X-axis direction and ones adjacent to each other on the other side (for example, right side of FIG. 11). Therefore, it is assumed that the source wire 127 is not interposed between the two pixel electrodes 124 having a positional relationship interposed between the two source wires 127. The two TFTs 123 connected to the two source wires 127 and the pixel electrodes 124 have a bilateral symmetrical shape as illustrated in FIG. 11. Of each of the two source wire 127 disposed at intervals in the X-axis direction, a plurality of touch wires 131 are disposed so as to be interposed between the two source wires 127 in which the pixel electrodes 124 are not interposed. That is, in the present embodiment, the plurality of touch wires 131 are arranged side by side on one side of the source wire 127, and the two pixel electrodes 124 are arranged side by side on the side of the source wire 127 opposite to the plurality of touch wire 131 side. The four touch wires 131 are arranged so as to be lined up in succession at a substantially constant interval. Although the touch wire 131 is provided at a ratio of two to one unit pixel UPX, it can be said that the touch wires 131 are not disposed for each of the unit pixels UPX, and is collectively disposed for each of two unit pixels UPX.

As illustrated in FIG. 12, the touch electrode 130 according to the present embodiment includes the opening portion 130A that overlaps with the four touch wires 131 arranged on one side of the source wire 127 and is formed in a range straddling the four touch wires 131. The opening portion 130A has an opening width over the entire width of the touch wire 131 group including four touch wires 131, and has a vertically elongated shape extending along the Y-axis direction which is the extending direction of the touch wires 131. Due to the opening portion 130A, the touch wire 131 group is collectively not overlapped with the touch electrode 130. The formation range of the four touch wires 131 in the X-axis direction (arrangement direction) is set to be narrower than the formation range of the pixel electrodes 124 in the X-axis direction. In this manner, the four touch wires 131 arranged on one side of the source wire 127 are unlikely to adversely affect the display, which is suitable for keeping the display quality high.

As described above, according to the present embodiment, the plurality of touch wires 131 arranged on at least one side of the source wire 127 are disposed so that the formation range in an arrangement direction of the touch wires 131 is narrower than the formation range of the pixel electrode 124 in the arrangement direction. The formation range of the plurality of touch wires 131 arranged on at least one side of the source wire 127 does not substantially contribute to the display. Therefore, as described above, the formation range of the plurality of touch wires 131 arranged on at least one side of the source wire 127 in the arrangement direction is narrower than the formation range of the pixel electrodes 124 in the arrangement direction. Therefore, the plurality of the touch wires 131 are unlikely to adversely affect the display, which is suitable for keeping the display quality high.

Embodiment 3

Embodiment 3 will be described with reference to FIGS. 13 to 15. In Embodiment 3, the arrangement of the touch wire 231 and the like are changed from Embodiment 1 described above. Overlapping description of the same structure, action and effect as those in Embodiment 1 described above will be omitted.

Figure 13:
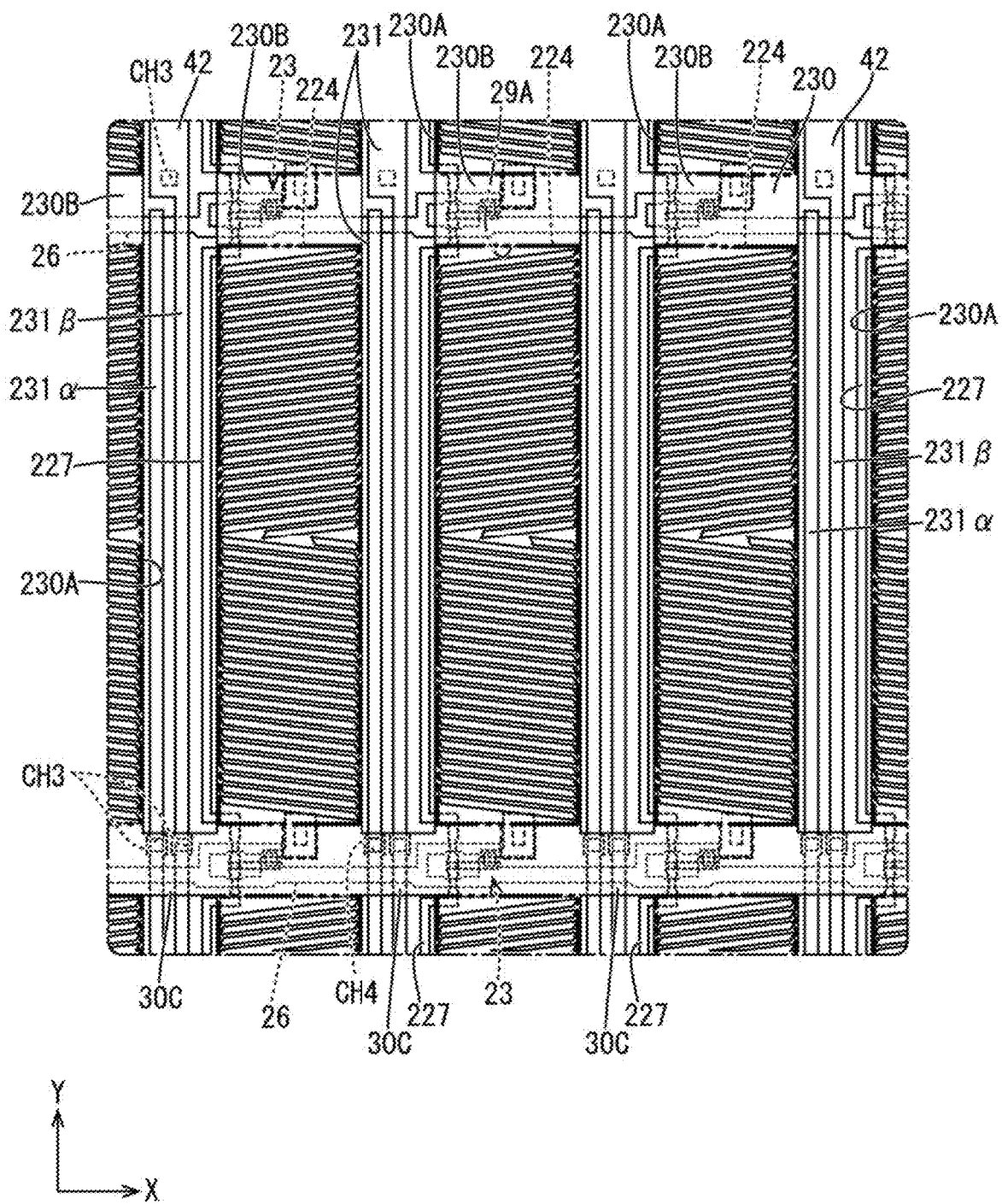
FIG. 13 is a plan view illustrating a pixel arrangement of a liquid crystal panel according to Embodiment 3.

FIG. 13 is a plan view illustrating the pixel arrangement of the liquid crystal panel. FIG. 14 is a plan view of the same range as that of FIG. 13 illustrating a pattern of the second transparent electrode film (touch electrode 230) provided on the array substrate.

Figure 14:
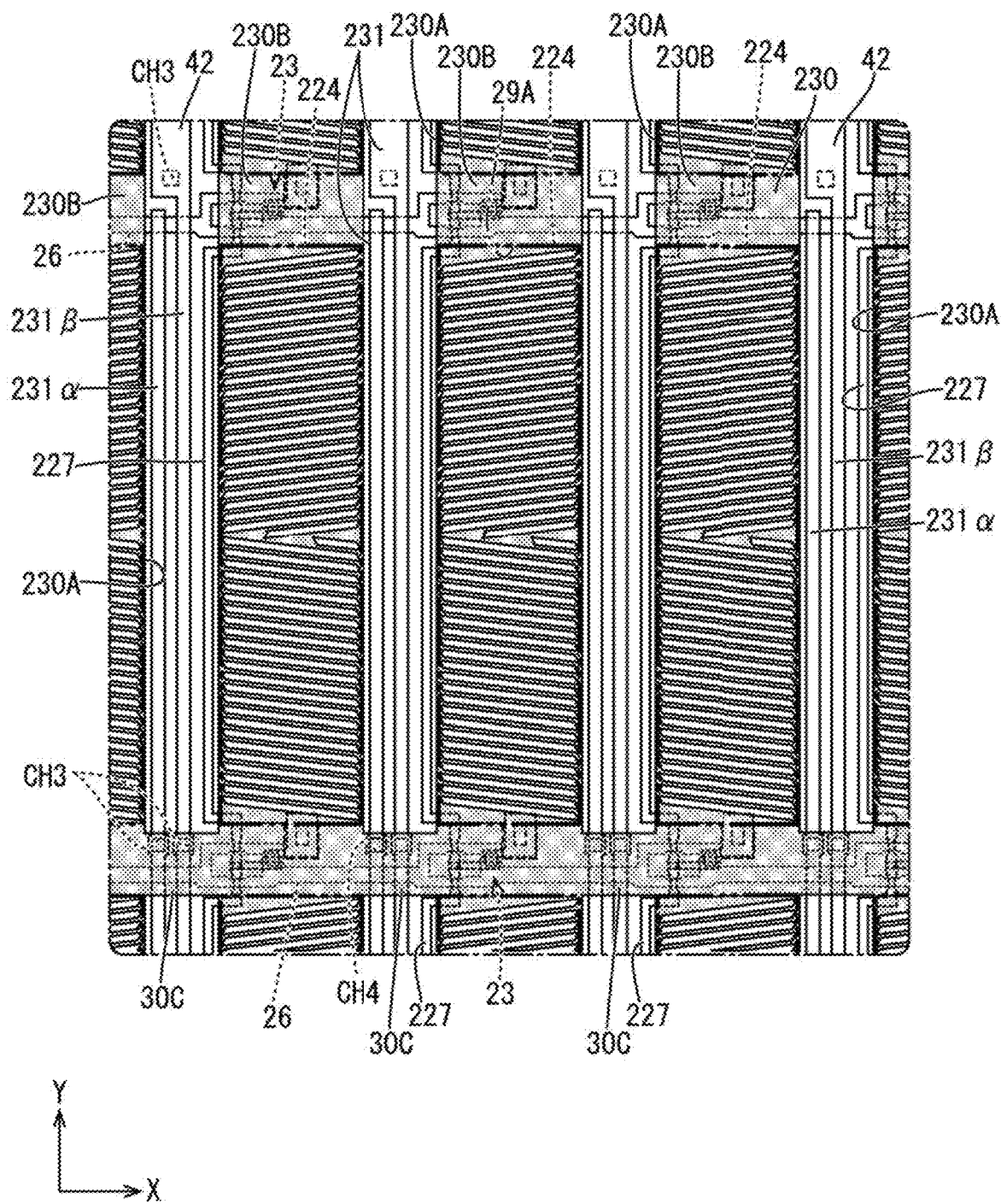
FIG. 14 is a plan view of the same range as that of FIG. 13 illustrating a pattern of a second transparent electrode film provided on an array substrate.

In FIG. 14, the touch electrode 230 formed of the second transparent electrode film is illustrated in a shaded shape. As illustrated in FIG. 13, the touch wires 231 according to the present embodiment are arranged so that a plurality of the touch wires 231 are lined up on one side of each of the plurality of source wires 227. Specifically, two touch wires 231 are arranged side by side on one side of the source wire 227 in succession. Of the two touch wires 231, one touch wire 231 is disposed so as to be adjacent to the source wire 227 at intervals, and the other touch wire 231 is disposed so as to be adjacent to the pixel electrode 224 at intervals. Two touch wire 231 arranged on one side of the source wire 227 form a set. The touch wires 231 are provided at a ratio of two to one unit pixel UPX, and the two touch wires 231 are disposed for each unit pixel UPX. Therefore, one source wire 227 and two touch wires 231 are interposed between the pixel electrodes 224 arranged along the X-axis direction, respectively.

As illustrated in FIG. 14, the touch electrode 230 according to the present embodiment includes the opening portion 230A that overlaps with the two touch wires 231 arranged on one side of the source wire 227 and is formed in a range straddling the two touch wires 231. The opening portion 230A has an opening width over the entire width of the touch wire 231 group including two touch wires 231, and has a vertically elongated shape extending along the Y-axis direction which is the extending direction of the touch wires 231. Due to this opening portion 230A, the touch wire 231 group is collectively not overlapped with the touch electrode 230. Moreover, the touch electrode 230 is disposed so that the plurality of pixel electrode overlapping portions 230B are overlapped with each of the plurality of pixel electrodes 224. Therefore, as compared with the case where the pixel electrode overlapping portion is provided in the range straddling the plurality of pixel electrodes 224, since the two touch wires 231 are distributed and disposed, the two touch wires 231 are unlikely to adversely affect the display, which is suitable for keeping the display quality high. Specifically, the formation range of the two touch wires 231 in the X-axis direction (arrangement direction) is much narrower than the formation range of the pixel electrodes 224 in the X-axis direction. In this manner, the two touch wires 231 arranged on one side of the source wire 227 are unlikely to adversely affect the display, which is suitable for keeping the display quality high.

Next, the connection relationship between the two touch wires 231 arranged on one side of each source wire 227 and the plurality of touch electrodes 230 arranged along the Y-axis direction will be described with reference to FIGS. 13 and 15. FIG. 15 is a plan view schematically illustrating the connection relationship between the touch electrode 230 and the touch wire 231 in the liquid crystal panel. As illustrated in FIG. 15, the two touch wires 231 arranged on one side of the source wire 227 are connected to the two touch electrodes 230 having different distances from the driver 213. Here, of the two touch wires 231 arranged on one side of the source wire 227, the wire connected to the touch electrode 230 located close to the driver 213 is referred to as a first touch wire (first position detection wire) 231α. The wire connected to the touch electrode 230 located far from the driver 213 is referred to as a second touch wire (second position detection wire) 231β. In the second touch wire 231β, the touch electrode 230 to be connected is disposed farther from the driver 213 than the first touch wire 231α, so that the length from the driver 213 to the touch electrode 230 is long. In addition, the width of the portion of the second touch wire 231β disposed on the side opposite to the driver 213 side than the touch electrode 230 to be connected to at least the first touch wire 231α is increased. That is, the second touch wire 231β partially has a wide portion 42 wider than the first touch wire 231α. In FIG. 15, the formation range of the wide portion 42 in the second touch wire 231β is illustrated by increasing the thickness.

Figure 15:
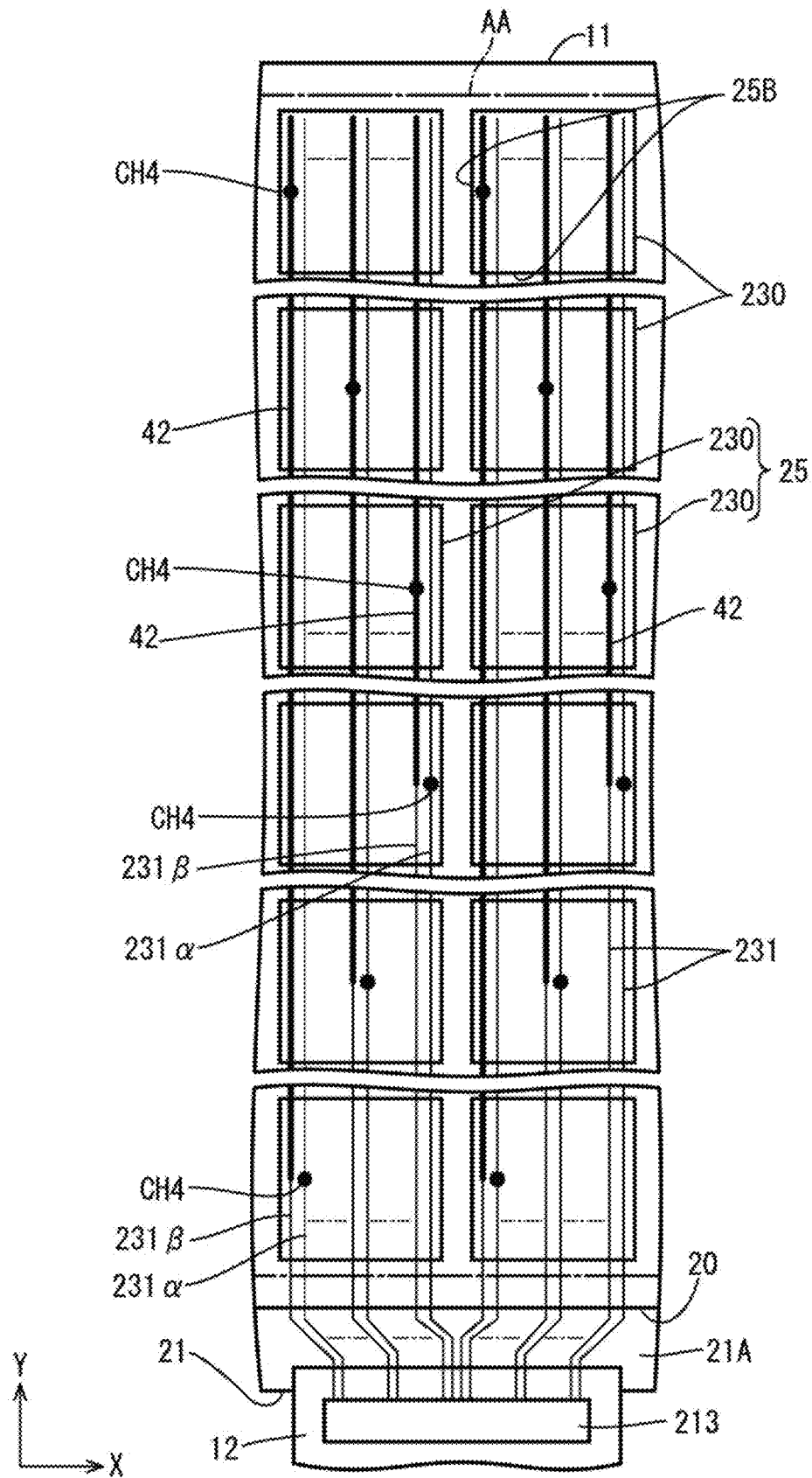
FIG. 15 is a plan view schematically illustrating a connection relationship between a touch electrode and a touch wire in the liquid crystal panel.

Specifically, as illustrated in FIGS. 13 and 15, the first touch wire 231α has an end at a position opposite to the driver 213 side in the Y-axis direction from the position (touch electrode contact hole CH4) where the touch electrode 230 to be connected is connected. On the other hand, in the second touch wire 231β, the portion opposite to the driver 213 side in the Y-axis direction from the position where the first touch wire 231α is connected to the touch electrode 230 to be connected is the wide portion 42 utilizing the arrangement space of the first touch wire 231α.

The second touch wire 231β having the wide portion 42 is designed to reduce the wiring resistance. As described above, the second touch wire 231β having the wide portion 42 and having a long length is connected to the touch electrode 230, which is located far from the driver 213 and tends to cause the signal to be likely to be dull, whereas the first touch wire 231α not having the wide portion 42 and having a short length is connected to the touch electrode 230, which is located close to the driver 213 and tends to cause the signal to be unlikely to be dull. Therefore, the load acting on each touch wire 231 that transmits a signal to each touch electrode 230 having a different distance from the driver 213 is equalized. As a result, the sensitivity related to position detection is further improved. Moreover, the formation range of the plurality of touch wires 231 arranged on at least one side of the source wire 227 in the arrangement direction of the touch wires 231 is equalized regardless of the distance from the driver 213.

More specifically, the connection modes are compared related to a set including the two touch wires 231 arranged on one side of each source wire 227. As illustrated in FIG. 15, the plurality of first touch wires 231α and the plurality of second touch wires 231β belonging to each set are configured so that the sum of the distances between the touch electrode 230 to be connected and the driver 213 is equal between the sets. For example, the first touch wire 231α connected to the touch electrode 230 located closest to the driver 213 of the plurality of touch electrodes 230 constitutes a set with the second touch wire 231β connected to the touch electrode 230 located farthest from the driver 213. The first touch wire 231α connected to the touch electrode 230 at the position second closest to the driver 213 of the plurality of touch electrodes 230 constitutes a set with the second touch wire 231β connected to the touch electrode 230 located at the second farthest position from the driver 213. In this manner, the wiring resistance of each first touch wire 231α belonging to each set is appropriately reduced according to the positional relationship between the touch electrode 230 and the driver 213 to be connected to each other, so that the signal supplied to each touch electrode 230 having a different distance from the driver 213 is more homogenized.

As described above, according to the present embodiment, the plurality of the touch wires 231 are arranged so as to be lined up on one side of each of the plurality of source wires 227. In this manner, since the touch electrode 230 is disposed so that the plurality of pixel electrode overlapping portions 230B are overlapped with each of the plurality of pixel electrodes 224, the plurality of touch wires 231 are distributed and disposed, as compared with the case where the pixel electrode overlapping portion is provided in a range straddling the plurality of pixel electrodes 224.

Here, the formation range of the plurality of touch wires 231 arranged on at least one side of the source wire 227 does not substantially contribute to the display. Therefore, when the plurality of the touch wires 231 are distributed so as to be arranged on one side of each of the plurality of source wires 227 as described above, the plurality of touch wires 231 are unlikely to adversely affect the display, which is suitable for keeping the display quality high.

The driver 213 connected to one end portion of at least the plurality of touch wires 231 to supply a signal is provided. The plurality of touch wires 231 arranged on at least one side of the source wire 227 include at least the first touch wire (first position detection wire) 231α connected to the touch electrode 230 located close to the driver 213 and the second touch wire (second position detection wire) 231β connected to the touch electrode 230 located far from the driver 213. The second touch wire 231β has a longer length than that of the first touch wire 231α, and a width of a portion disposed on a side opposite to the driver 213 is wider than that of the touch electrode 230 to be connected to the first touch wire 231α. In this manner, a signal is supplied from the driver 213 to the touch electrode 230 via the touch wire 231. Here, since the touch electrode 230 located far from the driver 213 of the plurality of touch electrodes 230 has a long signal transmission distance by the touch wire 231, as compared with the touch electrode 230 located close to the driver 213, signal dullness due to the wiring resistance of the touch wire 231 is likely to occur. On the other hand, the length of the first touch wire 231α to which the touch electrode 230 located close to the driver 213 is connected is shorter than that of the second touch wire 231β to which the touch electrode 230 located far from the driver 213 is connected. Therefore, of the second touch wires 231β, the width of the portion disposed on the side opposite to the driver 213 side than the touch electrode 230 to be connected to the first touch wire 231α is wider than that of the first touch wire 231α by using the arrangement space of the first touch wire 231α. As a result, the wiring resistance of the first touch wire 231α is reduced, so that the signal supplied to each touch electrode 230 having a different distance from the driver 213 is homogenized.

Moreover, the formation range of the plurality of touch wires 231 arranged on at least one side of the source wire 227 in the arrangement direction of the touch wires 231 is equalized regardless of the distance from the driver 213.

The plurality of pixel electrodes 224 and the plurality of source wires 227 are arranged, whereas each of the plurality of touch wires 231 are arranged so as to be lined up in a set on one side of each of the plurality of source wires 227 included in the plurality of source wires 227. The plurality of first touch wires 231α and the plurality of second touch wires 231β belonging to each set are configured so that the sum of the distances between the touch electrode 230 to be connected and the driver 213 is equal to each other in each of the sets. In this manner, for example, the first touch wire 231α connected to the touch electrode 230 located closest to the driver 213 of the plurality of touch electrodes 230 constitutes a set with the second touch wire 231β connected to the touch electrode 230 located farthest from the driver 213, whereas the first touch wire 231α connected to the touch electrode 230 at the position second closest to the driver 213 of the plurality of touch electrodes 230 constitutes a set with the second touch wire 231β connected to the touch electrode 230 at the position second farthest from the driver 213. As a result, the wiring resistance of each first touch wire 231α belonging to each set is appropriately reduced according to the positional relationship between the touch electrode 230 and the driver 213 to be connected to each other, so that the signal supplied to each touch electrode 230 having a different distance from the driver 213 is more homogenized.

Embodiment 4

Embodiment 4 will be described with reference to FIGS. 16 to 18. In Embodiment 4, the configurations of the source wire 327 and the touch wire 331 are changed from Embodiment 1 described above. Overlapping description of the same structure, action and effect as those in Embodiment 1 described above will be omitted.

Figure 16:
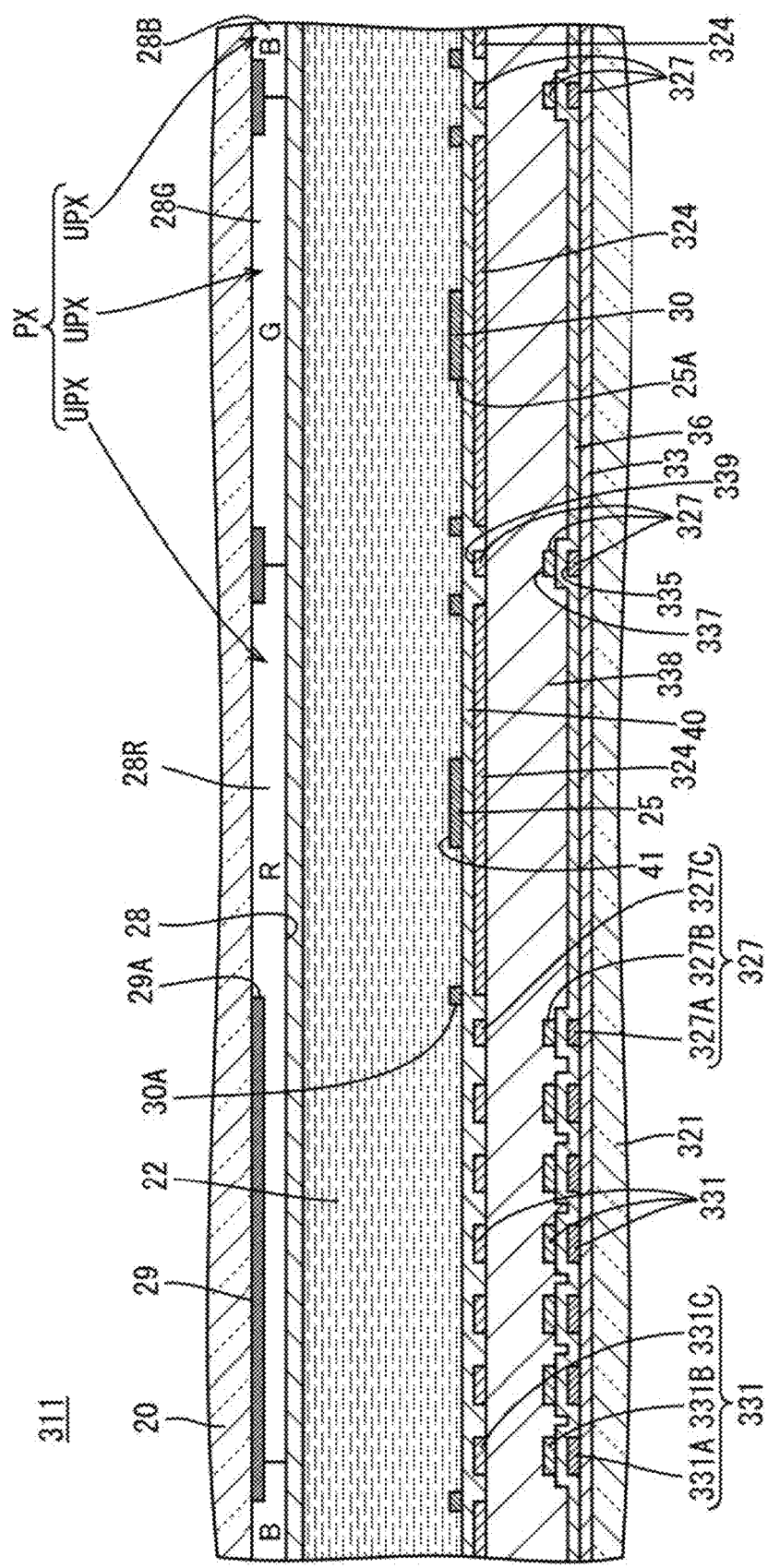
FIG. 16 is a cross-sectional view illustrating a pixel arrangement in a liquid crystal panel according to Embodiment 4.
Figure 17:
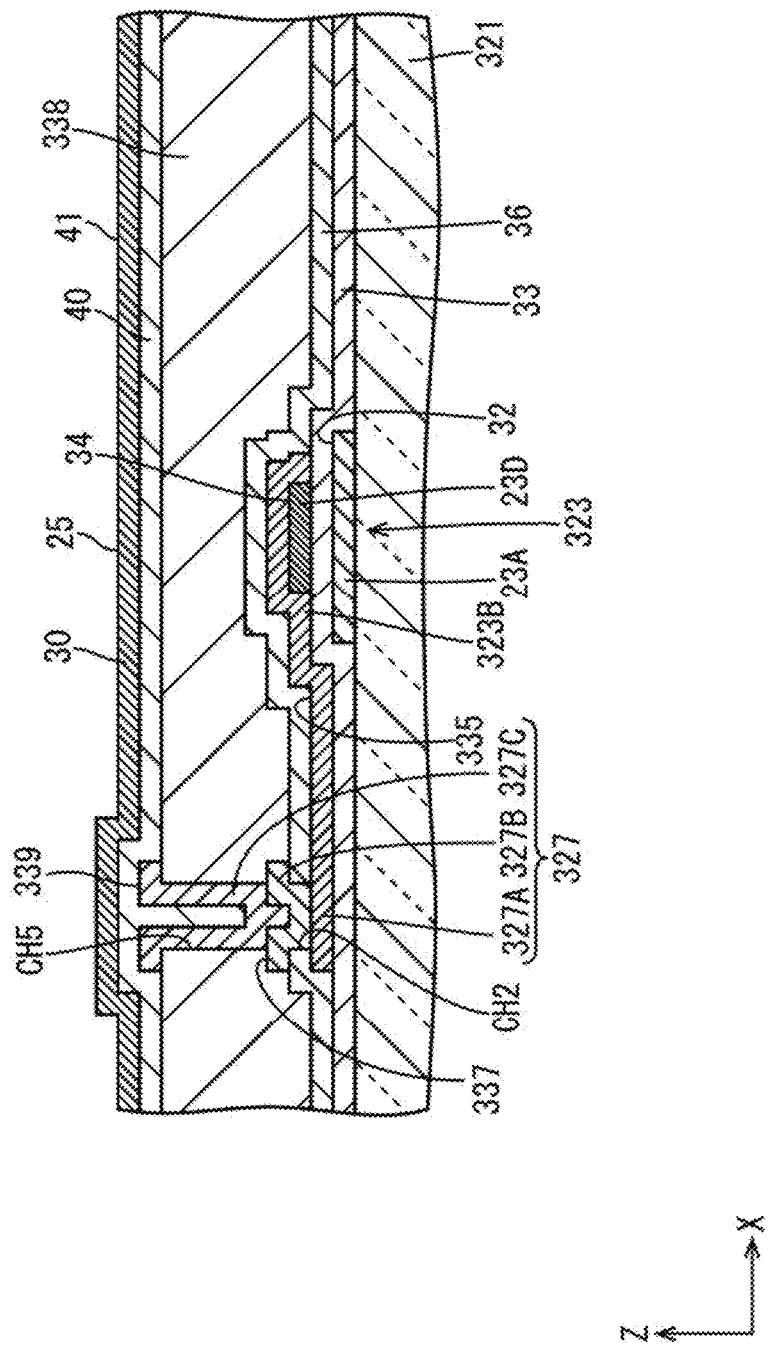
FIG. 17 is a cross-sectional view of the array substrate in the vicinity of a source electrode constituting a TFT.

FIG. 16 is a cross-sectional view illustrating a pixel arrangement in a liquid crystal panel 311. FIG. 17 is a cross-sectional view of an array substrate 321 in the vicinity of a source electrode 323B constituting a TFT 323. FIG. 18 is a cross-sectional view of the array substrate 321 in the vicinity of the connection structure between a second touch wire configuration unit 331B and a second touch wire configuration unit 331C described later. As illustrated in FIGS. 16 and 17, the source wire 327 according to the present embodiment includes a third source wire configuration unit (third image wire configuration unit) 327C located in the same layer as that of the pixel electrode 324 and formed of a first transparent electrode film 339. A third source wire configuration unit 327C has a line width substantially the same as that of the second source wire configuration unit 327B, and is disposed so as to overlap with the second source wire configuration unit 327B. Of the flattening films 338 interposed between a third metal film 337 and a first transparent electrode film 339, a second source wire contact hole (second image wire contact hole) CH5 is formed as an opening at a position overlapping with a position where the first source wire configuration unit 327A and the source electrode 323B are connected to each other. The second source wire configuration unit 327B formed of the third metal film 337 and the third source wire configuration unit 327C formed of the first transparent electrode film 339 are connected to each other via the second source wire contact hole CH5. The second source wire contact hole CH5 is provided at a position overlapping with the first source wire contact hole CH2. In this manner, the source wire 327 can be further made redundant, and the wiring resistance can be further reduced.

Figure 18:
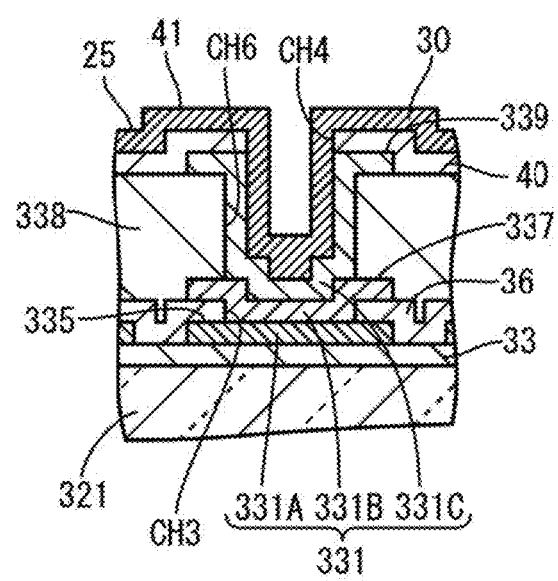
FIG. 18 is a cross-sectional view of the array substrate in the vicinity of a connection structure between a second touch wire configuration unit and a third touch wire configuration unit.

As illustrated in FIGS. 16 and 18, the touch wire 331 includes the third touch wire configuration unit (third position detection wire configuration unit) 331C located in the same layer as that of the pixel electrode 324 and formed of the first transparent electrode film 339. A third touch wire configuration unit 331C has a line width substantially the same as that of the second touch wire configuration unit 331B, and is disposed so as to overlap with the second touch wire configuration unit 331B.

Of the flattening films 338 interposed between the third metal film 337 and the first transparent electrode film 339, a second touch wire contact hole (second position detection wire contact hole) CH 6 is formed as an opening at a position overlapping with the first touch wire contact hole CH3, respectively.

The second touch wire configuration unit 331B formed of the third metal film 337 and the third touch wire configuration unit 331C formed of the first transparent electrode film 339 are connected to each other via the second touch wire contact hole CH6. In this manner, the touch wire 331 can be further made redundant, and the wiring resistance can be further reduced. Moreover, since the pixel electrode 324, the third source wire configuration unit 327C, and the third touch wire configuration unit 331C are located in the same layer, the number of layers can be reduced.

As described above, according to the present embodiment, the pixel electrode 324 is disposed on the upper layer side of the second source wire configuration unit 327B and the second touch wire configuration unit 331B with the flattening film (second insulating film) 338 in between, and the source wire 327 includes the third source wire configuration unit (third image wire configuration unit) 327C which is located in the same layer as that of the pixel electrode 324, is disposed so as to overlap with the second source wire configuration unit 327B, and is connected to the second source wire configuration unit 327B via the second source wire contact hole (second image wire contact hole) CH5 formed as an opening in the flattening film 338, whereas the touch wire 331 includes the third touch wire configuration unit (third position detection wire configuration unit) 331C which is located in the same layer as that of the pixel electrode 324, is disposed so as to overlap with the second touch wire configuration unit 331B, and is connected to the second touch wire configuration unit 331B via the second touch wire contact hole (second position detection wire contact hole) CH6 formed as an opening in the flattening film 338. In this manner, the source wire 327 and the touch wire 331 can be further made redundant, and the wiring resistance can be further reduced. Moreover, since the pixel electrode 324, the third source wire configuration unit 327C, and the third touch wire configuration unit 331C are located in the same layer, the number of layers can be reduced.

Embodiment 5

Embodiment 5 will be described with reference to FIG. 19. In Embodiment 5, a dummy touch wire (dummy position detection wire) 43 is added from Embodiment 1 described above. Overlapping description of the same structure, action and effect as those in Embodiment 1 described above will be omitted.

Figure 19:
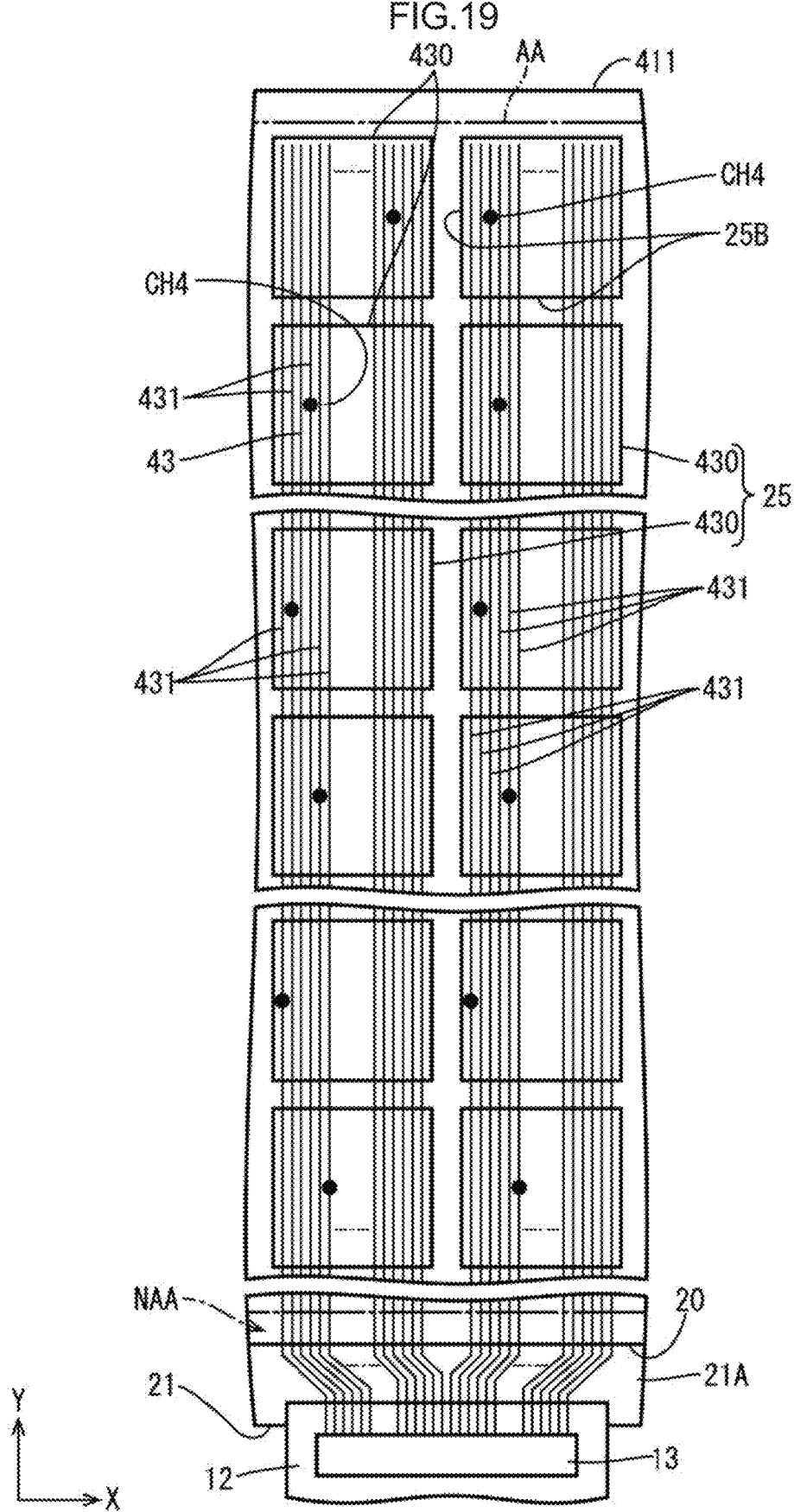
FIG. 19 is a plan view schematically illustrating a connection relationship between a touch electrode and a touch wire in a liquid crystal panel according to Embodiment 5.

FIG. 19 is a plan view schematically illustrating a connection relationship between a touch electrode 430 and a touch wire 431 in a liquid crystal panel 411. In the present embodiment, as illustrated in FIG. 19, the ratio obtained by dividing the number of arrangements of the touch electrodes 430 arranged along the Y-axis direction in the display region AA divided by the number of arrangements of pixel electrodes (unit pixels) arranged along the X-axis direction in the formation range of one touch electrode 430 is an irrational number. Therefore, when the same number of touch wires are arranged side by side on one sides of all the source wires, there is a possibility that a surplus is generated in the touch wires. At this time, in a case where the number of touch wires arranged on one side of each source wire is different, since the formation range in the X-axis direction in the touch wire group varies, the display quality may be adversely affected. Therefore, in the present embodiment, a dummy touch wire (dummy position detection wire) 43 is provided so as to be adjacent to any one of the plurality of touch wires 431 arranged on one side of the source wire. The dummy touch wire 43 has the same configuration as that of the touch wire 431 except that the dummy touch wire 43 is not connected to any of the touch electrodes 430. FIG. 19 illustrates a set including one dummy touch wire 43 and five touch wires 431, and a set including six touch wires 431 not including the dummy touch wire 43. The formation range of one dummy touch wire 43 and the five touch wires 431 in the X-axis direction is substantially the same as the formation range of the six touch wires 431 not including the dummy touch wire 43 in the X-axis direction. In this manner, the formation range in the X-axis direction in each touch wire 431 group is made uniform, and the display quality can be kept good.

According to the present embodiment as described above, the plurality of pixel electrodes and the plurality of source wires are arranged, whereas the plurality of touch wires 431 are arranged so as to be lined up on one side of each of at least two source wires included in the plurality of source wires, and include the dummy touch wire (dummy position detection wire) 43 that is disposed adjacent to at least one of the plurality of touch wires 431 arranged on one side of the source wire and is not connected to the touch electrode 430.

For example, when the numbers of the plurality of touch wires 431 arranged on at least one side are different for each of the at least two source wires, it is possible to dispose the dummy touch wire 43 so as to be adjacent to any one of the plurality of touch wires 431 which are insufficient in number. As a result, it is possible to make the formation range of the plurality of touch wires 431 arranged on at least one side of each of the at least two source wires in the arrangement direction of the touch wires 431 uniform, so that the display quality can be kept good.

OTHER EMBODIMENT

The techniques disclosed herein are not limited to the embodiments described above and in the drawings, and for example, the following embodiments are also included in the technical scope.

(1) The specific number of arrangements of the touch wires 31, 131, 231, 331, and 431 arranged on one side of the source wires 27, 127, 227, and 327 can be appropriately changed.

For example, in a case where the ratio obtained by dividing the number of arrangements of the touch electrodes 30, 130, 230, and 430 arranged along the Y-axis direction in the display region AA by the number of arrangements of the pixel electrodes 24, 124, 224, and 324 (unit pixels UPX) arranged along the X-axis direction in the formation range of one touch electrode 30, 130, 230, and 430 is "3", the number of arrangements of the touch wires 31, 131, 231, 331, and 431 is "9" in the configurations of Embodiments 1, 4, and 5, is "6" in the configuration of Embodiment 2, and is "3" in the configuration of Embodiment 3.

(2) The touch wires 31, 131, 231, 331, and 431 may be disposed on both sides of the source wires 27, 127, 227, and 327. Even in that case, a plurality of touch wires 31, 131, 231, 331, and 431 are arranged on at least one side of the source wires 27, 127, 227, and 327.

(3) The specific numerical value relating to the ratio obtained by dividing the number of arrangements of the touch electrodes 30, 130, 230, and 430 arranged along the Y-axis direction in the display region AA by the number of arrangements of the pixel electrodes 24, 124, 224, and 324 (unit pixels UPX) arranged along the X-axis direction in the formation range of one touch electrode 30, 130, 230, and 430 can be appropriately changed. In a case where the numerical value is an irrational number, the dummy touch wire 43 described in Embodiment 4 can be appropriately provided, and this is not necessarily the case.

(4) As a modification example of Embodiment 2, each source wire 127 may be disposed adjacent to each pixel electrode 124 on the same side in the X-axis direction. The pixel overlapping opening portion 25A formed in the common electrode 25 may have a symmetrical shape with respect to the center position of the pixel electrodes 124 adjacent to each other in the X-axis direction.

(5) In a configuration in which two touch wires 231 are arranged on one side of the source wire 227 as in Embodiment 3, in a case where there is a difference between the distance between one touch wire 231 and the source wire 227 and the distance between the other touch wire 231 and the pixel electrode 224, the touch wire 231 having a long distance can be connected to the touch electrode 230 far from the driver 213.

(6) As a modification example of Embodiment 4, the third source wire configuration unit 327C and the third touch wire configuration unit 331C may each be formed of the same second transparent electrode film 41 as that of the touch electrode 30. In that case, the bridge portion 30C constituting the touch electrode 30 may be formed of the same first transparent electrode film 339 as that of the pixel electrode 324, and may be connected to the pixel electrode overlapping portion 30B formed of the second transparent electrode film 41 via the contact hole formed as an opening in the second interlayer insulating film 40.

(7) For the opening portions 30A, 130A, and 230A of the touch electrodes 30, 130, 230, and 430, the number of installations, the arrangement in the Y-axis direction, the formation range in the Y-axis direction, and the like can be appropriately changed. For example, the opening portions 30A, 130A, and 230A may be disposed so as to overlap with all the gate wires 26.

(8) For the bridge portion 30C, the number of installations, the arrangement in the Y-axis direction, the formation range in the Y-axis direction, and the like can be appropriately changed. For example, the bridge portion 30C may be disposed so as not to overlap with the gate wire 26. The same number of bridge portions 30C may be installed as the number of gate wires 26 so as to be overlapped with all the gate wires 26.

(9) The number of installations of the first touch wire contact hole CH3 and the second touch wire contact hole CH6, the arrangement in the Y-axis direction, and the like can be appropriately changed. For example, the first touch wire contact hole CH3 and the second touch wire contact hole CH6 may be disposed so as not to overlap with the bridge portion 30C. The first touch wire contact hole CH3 and the second touch wire contact hole CH6 may be disposed so as to overlap with the gate wire 26. The first touch wire contact hole CH3 and the second touch wire contact hole CH6 may have different positions in the Y-axis direction between the touch wires 31, 131, 231, 331, and 431 adjacent to each other.

(10) The source wires 27, 127, 227, and 327 may have a single-layer structure. Similarly, the touch wires 31, 131, 231, 331, and 431 may have a single-layer structure.

(11) The source wires 27, 127, 227, and 327 may have a laminated structure of four or more layers. Similarly, the touch wires 31, 131, 231, 331, and 431 may have a laminated structure of four or more layers.

(12) A plurality of touch wires 31, 131, 231, 331, and 431 may be connected to one touch electrode 30, 130, 230, and 430.

(13) The specific planar shape of the pixel overlapping opening portion 25A provided in the common electrode 25 can be appropriately changed. The specific number of installations, the arrangement pitch, and the like of the pixel overlapping opening portions 25A can be appropriately changed.

(14) It is also possible to omit the pixel overlapping opening portion 25A of the common electrode 25 and provide a common electrode overlapping opening portion on the pixel electrodes 24, 124, 224, and 324. It is also possible that the common electrode 25 is formed of the first transparent electrode films 39 and 339 and the pixel electrodes 24, 124, 224, and 324 are formed of the second transparent electrode films 41 and 441.

(15) The specific number of installations of the flexible substrates 12 and the drivers 13 and 213 can be appropriately changed.

(16) The drivers 13 and 213 may be mounted directly on the array substrates 21 and 321 by chip on glass (COG).

(17) It is also possible to omit the gate circuit unit 14. In that case, a gate driver having the same function as that of the gate circuit unit 14 may be mounted on the array substrates 21 and 321. It is also possible to provide the gate circuit unit 14 only on one side of the array substrates 21 and 321.

(18) The display mode of the liquid crystal panels 11, 311, and 411 may be an IPS mode or the like.

(19) The touch panel pattern may be a mutual capacitance method.

(20) The liquid crystal panels 11, 311, and 411 may be a reflective type or a transflective type.

(21) The planar shape of the liquid crystal display device 10 may be a vertically long rectangle, a square, a circle, a semicircle, an oval, an ellipse, a trapezoid, or the like.

(22) It is also possible to use a display panel other than the liquid crystal panels 11, 311, and 411 (for example, organic EL display panel).

What is claimed is:

1. A display device including a position input function, comprising:
    a pixel electrode;
    an image wire that is disposed adjacent to the pixel electrode and supplies an image signal to the pixel electrode;
    a plurality of position detection wires that are arranged side by side on at least one side of the image wire; and
    a plurality of position detection electrodes that are connected to the plurality of position detection wires, form a capacitance with a position input body performing position input, detect an input position by the position input body, and include an opening portion which overlaps with the plurality of position detection wires arranged on the at least one side of the image wire and is formed in a range straddling the plurality of position detection wires; wherein
    the opening portion includes an opening width which extends over an entire width of the plurality of position detection wires; and
    the opening portion extends along an extending direction of the plurality of position detection wires.

2. The display device including a position input function according to claim 1, wherein
    the pixel electrode includes a plurality of pixel electrodes and the image wire includes a plurality of image wires, whereas the plurality of position detection wires are arranged so as to be lined up on one side of at least one image wire included in the plurality of image wires and to be interposed between pixel electrodes adjacent to each other, and
    each of the position detection electrodes includes a plurality of pixel electrode overlapping portions that overlap with at least the pixel electrode and are disposed so as to interpose the plurality of position detection wires, and a bridge portion that is disposed so as to cross the plurality of position detection wires and connects the pixel electrode overlapping portions adjacent to each other.

3. The display device including a position input function according to claim 2, wherein
    the plurality of pixel electrodes are arranged side by side on at least one side of the plurality of position detection wires arranged on the at least one side of the image wire, and
    the pixel electrode overlapping portions are provided in a range straddling the plurality of pixel electrodes arranged on the at least one side of the plurality of position detection wires.

4. The display device including a position input function according to claim 3, further comprising:
    a color filter formed of a plurality of colored portions disposed so as to overlap with the pixel electrodes and exhibiting different colors from each other;
    a plurality of unit pixels formed of a set of a colored portion and a pixel electrode overlapping with the colored portion; and
    a plurality of display pixels formed of a plurality of unit pixels adjacent to each other and exhibiting different colors from each other, wherein
    the plurality of position detection wires arranged on the at least one side of the image wire are disposed so as to be interposed between the display pixels adjacent to each other.

5. The display device including a position input function according to claim 2, wherein
    the plurality of position detection wires are arranged so as to be lined up on one side of each of the plurality of image wires.

6. The display device including a position input function according to claim 2, wherein
    in the plurality of position detection wires arranged on the at least one side of the image wire, at least one of the position detection wires is connected to a bridge portion overlapping with the position detection wire.

7. The display device including a position input function according to claim 1, wherein
    the plurality of position detection wires arranged on the at least one side of the image wire are disposed so that a formation range in an arrangement direction of the position detection wires is narrower than a formation range in an arrangement direction of the pixel electrode.

8. The display device including a position input function according to claim 1, further comprising:
    a signal supply unit that is connected to one end portion of at least a plurality of position detection wires and supplies a signal, wherein
    of the plurality of position detection wires arranged on the at least one side of the image wire, a position detection wire located far from the image wire and the pixel electrode is configured so that a position detection electrode to be connected is located far from the signal supply unit, as compared with a position detection wire located close to the image wire and the pixel electrode.

9. The display device including a position input function according to claim 1, wherein
    three or more position detection wires are arranged side by side on the at least one side of the image wire.

10. The display device including a position input function according to claim 1, further comprising:
    a signal supply unit that is connected to one end portion of at least a plurality of position detection wires and supplies a signal, wherein
    the plurality of position detection wires arranged on the at least one side of the image wire include at least a first position detection wire that is connected to a position detection electrode located close to the signal supply unit and a second position detection wire that is connected to a position detection electrode located far from the signal supply unit, and the second position detection wire is longer than the first position detection wire, and has portion which is large in width and disposed on a side opposite to a signal supply unit side of a position detection electrode to be connected to the first position detection wire.

11. The display device including a position input function according to claim 10, wherein the pixel electrode includes a plurality of pixel electrodes and the image wire includes a plurality of image wires, whereas a plurality of position detection wires are arranged so as to be lined up in a set on one side of each of a plurality of image wires included in the plurality of image wires, and a plurality of first position detection wires and a plurality of second position detection wires constituting sets are configured so that a sum of distances between position detection electrodes to be connected and the signal supply unit is equal to each other between each of the sets.

12. The display device including a position input function according to claim 1, wherein the pixel electrode includes a plurality of pixel electrodes and the image wire includes a plurality of image wires, whereas a plurality of position detection wires are arranged so as to be lined up on one side of each of at least two image wires included in the plurality of image wires, and the display device further comprises a dummy position detection wire that is disposed adjacent to any of the plurality of position detection wires arranged on the at least one side of the image wire and is not connected to a position detection electrode.

13. The display device including a position input function according to claim 1, further comprising:

a light shielding portion that overlaps with the plurality of position detection wires arranged on the at least one side of the image wire and is formed in a range straddling the plurality of position detection wires to shield light.

14. The display device including a position input function according to claim 1, wherein the image wire includes a first image wire configuration unit and a second image wire configuration unit that is disposed so as to overlap with an upper layer side of the first image wire configuration unit with a first insulating film in between and is connected to the first image wire configuration unit via a first image wire contact hole formed as an opening in the first insulating film, whereas the position detection wire includes a first position detection wire configuration unit that is located in a layer identical with a layer of the first image wire configuration unit, and a second position detection wire configuration unit that is located in a layer identical with a layer of the second image wire configuration unit, is disposed so as to overlap with the first position detection wire configuration unit, and is connected to the first position detection wire configuration unit via a first position detection wire contact hole formed as an opening in the first insulating film.

15. The display device including a position input function according to claim 14, wherein the pixel electrode is disposed on an upper layer side of the second image wire configuration unit and the second position detection wire configuration unit with a second insulating film in between, and the image wire includes a third image wire configuration unit that is located in a layer identical with a layer of the pixel electrode, is disposed so as to overlap with the second image wire configuration unit, and is connected to the second image wire configuration unit via a second image wire contact hole formed as an opening in the second insulating film, whereas the position detection wire includes a third position detection wire configuration unit that is located in a layer identical with the layer of the pixel electrode, is disposed so as to overlap with the second position detection wire configuration unit, and is connected to the second position detection wire configuration unit via a second position detection wire contact hole formed as an opening in the second insulating film.

16. A display device including a position input function, comprising:

a pixel electrode;

an image wire that is disposed adjacent to the pixel electrode and supplies an image signal to the pixel electrode;

a plurality of position detection wires that are arranged side by side on at least one side of the image wire; and a plurality of position detection electrodes that are connected to the plurality of position detection wires, form a capacitance with a position input body performing position input, detect an input position by the position input body, and include an opening portion which overlaps with the plurality of position detection wires arranged on the at least one side of the image wire and is formed in a range straddling the plurality of position detection wires; wherein the pixel electrode includes a plurality of pixel electrodes and the image wire includes a plurality of image wires, whereas the plurality of position detection wires are arranged so as to be lined up on one side of at least one image wire included in the plurality of image wires and to be interposed between pixel electrodes adjacent to each other;

each of the position detection electrodes includes a plurality of pixel electrode overlapping portions that overlap with at least the pixel electrode and are disposed so as to interpose the plurality of position detection wires, and a bridge portion that is disposed so as to cross the plurality of position detection wires and connects the pixel electrode overlapping portions adjacent to each other;

the plurality of pixel electrodes are arranged side by side on at least one side of the plurality of position detection wires arranged on the at least one side of the image wire; and the pixel electrode overlapping portions are provided in a range straddling the plurality of pixel electrodes arranged on the at least one side of the plurality of position detection wires.

17. The display device including a position input function according to claim 16, further comprising:

a color filter formed of a plurality of colored portions disposed so as to overlap with the pixel electrodes and exhibiting different colors from each other;

a plurality of unit pixels formed of a set of a colored portion and a pixel electrode overlapping with the colored portion; and a plurality of display pixels formed of a plurality of unit pixels adjacent to each other and exhibiting different colors from each other; wherein the plurality of position detection wires arranged on the at least one side of the image wire are disposed so as to be interposed between the display pixels adjacent to each other.

18. A display device including a position input function, comprising:

a pixel electrode;

an image wire that is disposed adjacent to the pixel electrode and supplies an image signal to the pixel electrode;

a plurality of position detection wires that are arranged side by side on at least one side of the image wire; and a plurality of position detection electrodes that are connected to the plurality of position detection wires, form a capacitance with a position input body performing position input, detect an input position by the position input body, and include an opening portion which overlaps with the plurality of position detection wires arranged on the at least one side of the image wire and is formed in a range straddling the plurality of position detection wires; wherein the image wire includes a first image wire configuration unit and a second image wire configuration unit that is disposed so as to overlap with an upper layer side of the first image wire configuration unit with a first insulating film in between and is connected to the first image wire configuration unit via a first image wire contact hole formed as an opening in the first insulating film, whereas the position detection wire includes a first position detection wire configuration unit that is located in a layer identical with a layer of the first image wire configuration unit, and a second position detection wire configuration unit that is located in a layer identical with a layer of the second image wire configuration unit, is disposed so as to overlap with the first position detection wire configuration unit, and is connected to the first position detection wire configuration unit via a first position detection wire contact hole formed as an opening in the first insulating film.

19. The display device including a position input function according to claim 18, wherein the pixel electrode is disposed on an upper layer side of the second image wire configuration unit and the second position detection wire configuration unit with a second insulating film in between, and the image wire includes a third image wire configuration unit that is located in a layer identical with a layer of the pixel electrode, is disposed so as to overlap with the second image wire configuration unit, and is connected to the second image wire configuration unit via a second image wire contact hole formed as an opening in the second insulating film, whereas the position detection wire includes a third position detection wire configuration unit that is located in a layer identical with the layer of the pixel electrode, is disposed so as to overlap with the second position detection wire configuration unit, and is connected to the second position detection wire configuration unit via a second position detection wire contact hole formed as an opening in the second insulating film.

* * * * *